US009540043B2

(12) United States Patent
Lavoie

(10) Patent No.: US 9,540,043 B2
(45) Date of Patent: Jan. 10, 2017

(54) TRAILER BACKUP ASSIST SYSTEM WITH ACTIVE TRAILER BRAKING FOR CURVATURE CONTROL

(71) Applicant: Ford Global Technologies, LLC, Dearborn, MI (US)

(72) Inventor: Erick Michael Lavoie, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/447,006

(22) Filed: Jul. 30, 2014

(65) Prior Publication Data
US 2016/0031482 A1 Feb. 4, 2016

(51) Int. Cl.
*B62D 13/06* (2006.01)
*B60W 10/18* (2012.01)
(Continued)

(52) U.S. Cl.
CPC .............. *B62D 13/06* (2013.01); *B60W 10/18* (2013.01); *B60W 10/20* (2013.01);
(Continued)

(58) Field of Classification Search
CPC ....... B62D 13/06; B60W 10/20; B60W 10/18; B60W 2520/06; B60W 2520/10; B60W 2710/18; B60W 2720/22; B60W 2710/207; B60W 2520/22; B60W 2720/10
See application file for complete search history.

(56) References Cited

U.S. PATENT DOCUMENTS 3,542,390 A 11/1970 Fikse et al.
3,756,624 A 9/1973 Taylor
(Continued)

FOREIGN PATENT DOCUMENTS

CN 202159367 U 3/2012
DE 3931518 A1 4/1991
(Continued)

OTHER PUBLICATIONS

Jae Il Roh, Hyunsuk Lee, Woojin Chung; "Control of a Car with Trailer using the Driver Assistance System," Proceedings of the 2011 IEEE/International Conference on Robotics and Biometics, Dec. 7-11, 2011, pp. 2890-2895, Phucket Thailand.
(Continued)

*Primary Examiner* — Rodney Butler
*Assistant Examiner* — Frederick Brushaber
(74) *Attorney, Agent, or Firm* — Raymond Coppiellie; Price Heneveld LLP

(57) ABSTRACT

A trailer backup assist system for a vehicle, according to one embodiment, includes a trailer coupled with the vehicle. The trailer of the trailer backup assist system has a braking system. The trailer backup assist system also includes a sensor that senses a hitch angle between the vehicle and the trailer. In addition, the trailer backup assist system includes a steering input device that provides a desired curvature of the trailer. The trailer backup assist system further includes a controller generating a steering command based on the hitch angle for the vehicle to guide the trailer on the desired curvature and an actuation command for the braking system to reduce a rearward travel distance for the trailer to achieve the desired curvature.

18 Claims, 12 Drawing Sheets

(51) Int. Cl.
*B60W 10/20* (2006.01)
*B62D 15/02* (2006.01)

(52) U.S. Cl.
CPC ..... *B62D 15/0285* (2013.01); *B60W 2520/06* (2013.01); *B60W 2520/10* (2013.01); *B60W 2520/22* (2013.01); *B60W 2710/18* (2013.01); *B60W 2710/207* (2013.01); *B60W 2720/10* (2013.01); *B60W 2720/22* (2013.01)

(56) References Cited

U.S. PATENT DOCUMENTS

| | | |
|---|---|---|
| 3,860,257 A | 1/1975 | Mesly |
| 4,042,132 A | 8/1977 | Bohman et al. |
| 4,735,432 A | 4/1988 | Brown |
| 4,752,080 A | 6/1988 | Rogers |
| 4,848,499 A | 7/1989 | Martinet et al. |
| 5,001,639 A | 3/1991 | Breen |
| 5,108,158 A | 4/1992 | Breen |
| 5,246,242 A | 9/1993 | Penzotti |
| 5,247,442 A | 9/1993 | Kendall |
| 5,558,350 A | 9/1996 | Kimbrough et al. |
| 5,586,814 A | 12/1996 | Steiner |
| 6,042,196 A | 3/2000 | Nakamura et al. |
| 6,056,371 A | 5/2000 | Lin et al. |
| 6,292,094 B1 | 9/2001 | Deng et al. |
| 6,351,698 B1 | 2/2002 | Kubota et al. |
| 6,409,288 B2 | 6/2002 | Yoshida et al. |
| 6,494,476 B2 | 12/2002 | Masters et al. |
| 6,498,977 B2 | 12/2002 | Wetzel et al. |
| 6,567,731 B2 | 5/2003 | Chandy |
| 6,838,979 B2 | 1/2005 | Deng et al. |
| 7,032,705 B2 | 4/2006 | Zheng et al. |
| 7,117,077 B2 | 10/2006 | Michi et al. |
| 7,136,754 B2 | 11/2006 | Hahn et al. |
| 7,139,650 B2 * | 11/2006 | Lubischer ............ B60K 41/282 701/48 |
| 7,154,385 B2 | 12/2006 | Lee et al. |
| 7,165,820 B2 | 1/2007 | Rudd, III |
| 7,219,913 B2 | 5/2007 | Atley |
| 7,319,927 B1 | 1/2008 | Sun et al. |
| 7,690,737 B2 | 4/2010 | Lu |
| 7,793,965 B2 | 9/2010 | Padula |
| 7,969,326 B2 | 6/2011 | Sakakibara |
| 8,010,253 B2 | 8/2011 | Lundquist |
| 8,033,955 B2 | 10/2011 | Farnsworth |
| 8,036,792 B2 | 10/2011 | Dechamp |
| 8,108,116 B2 | 1/2012 | Mori et al. |
| 8,170,726 B2 | 5/2012 | Chen et al. |
| 8,244,442 B2 | 8/2012 | Craig et al. |
| 8,260,518 B2 | 9/2012 | Englert |
| 8,267,485 B2 | 9/2012 | Barlsen et al. |
| 8,280,607 B2 | 10/2012 | Gatti et al. |
| 8,374,749 B2 | 2/2013 | Tanaka |
| 8,430,792 B2 | 4/2013 | Noll |
| 8,469,125 B2 | 6/2013 | Yu et al. |
| 8,571,758 B2 | 10/2013 | Klier et al. |
| 8,755,982 B2 | 6/2014 | Heckel et al. |
| 8,755,984 B2 | 6/2014 | Rupp et al. |
| 8,798,860 B2 | 8/2014 | Dechamp |
| 8,825,328 B2 * | 9/2014 | Rupp ............ B62D 13/06 303/123 |
| 8,909,426 B2 | 12/2014 | Rhode et al. |
| 8,930,140 B2 | 1/2015 | Trombley et al. |
| 9,102,271 B2 | 8/2015 | Trombley et al. |
| 9,108,598 B2 | 8/2015 | Headley |
| 9,132,856 B2 | 9/2015 | Shepard |
| 9,180,890 B2 | 11/2015 | Lu et al. |
| 9,248,858 B2 | 2/2016 | Lavoie et al. |
| 9,335,162 B2 | 5/2016 | Kyrtsos et al. |
| 2001/0037164 A1 | 11/2001 | Hecker |
| 2001/0052434 A1 | 12/2001 | Ehrlich et al. |
| 2004/0199319 A1 * | 10/2004 | Lubischer ............ B60K 41/282 701/48 |
| 2005/0206225 A1 | 9/2005 | Offerle et al. |
| 2005/0236201 A1 | 10/2005 | Spannheimer et al. |
| 2005/0236896 A1 | 10/2005 | Offerle et al. |
| 2006/0103511 A1 | 5/2006 | Lee et al. |
| 2006/0142936 A1 | 6/2006 | Dix |
| 2007/0027581 A1 | 2/2007 | Bauer et al. |
| 2007/0198190 A1 | 8/2007 | Bauer et al. |
| 2008/0177443 A1 | 7/2008 | Lee et al. |
| 2009/0082935 A1 | 3/2009 | Leschuk et al. |
| 2009/0157260 A1 | 6/2009 | Lee |
| 2009/0198425 A1 | 8/2009 | Englert |
| 2009/0271078 A1 | 10/2009 | Dickinson |
| 2009/0306854 A1 | 12/2009 | Dechamp |
| 2009/0306861 A1 | 12/2009 | Schumann et al. |
| 2009/0326775 A1 | 12/2009 | Nishida |
| 2010/0152989 A1 | 6/2010 | Smith et al. |
| 2011/0087398 A1 | 4/2011 | Lu et al. |
| 2012/0041658 A1 | 2/2012 | Turner |
| 2012/0095649 A1 | 4/2012 | Klier et al. |
| 2012/0200706 A1 | 8/2012 | Greenwood et al. |
| 2012/0271512 A1 | 10/2012 | Rupp et al. |
| 2012/0271514 A1 | 10/2012 | Lavoie et al. |
| 2012/0271515 A1 * | 10/2012 | Rhode ............ B62D 1/22 701/42 |
| 2012/0271522 A1 | 10/2012 | Rupp et al. |
| 2012/0283909 A1 | 11/2012 | Dix |
| 2012/0310594 A1 | 12/2012 | Watanabe |
| 2012/0316732 A1 | 12/2012 | Auer |
| 2013/0148748 A1 | 6/2013 | Suda |
| 2013/0179038 A1 | 7/2013 | Goswami et al. |
| 2013/0268160 A1 | 10/2013 | Trombley et al. |
| 2014/0052337 A1 | 2/2014 | Lavoie et al. |
| 2014/0058614 A1 | 2/2014 | Trombley et al. |
| 2014/0058622 A1 | 2/2014 | Trombley et al. |
| 2014/0058655 A1 | 2/2014 | Trombley et al. |
| 2014/0058668 A1 | 2/2014 | Trombley et al. |
| 2014/0067154 A1 | 3/2014 | Yu et al. |
| 2014/0067155 A1 | 3/2014 | Yu et al. |
| 2014/0085472 A1 | 3/2014 | Lu et al. |
| 2014/0121930 A1 | 5/2014 | Allexi et al. |
| 2014/0160276 A1 | 6/2014 | Pliefke et al. |
| 2014/0172232 A1 | 6/2014 | Rupp et al. |
| 2014/0188344 A1 | 7/2014 | Lavoie |
| 2014/0188346 A1 | 7/2014 | Lavoie |
| 2014/0210456 A1 | 7/2014 | Crossman |
| 2014/0218506 A1 | 8/2014 | Trombley et al. |
| 2014/0218522 A1 | 8/2014 | Lavoie et al. |
| 2014/0222288 A1 | 8/2014 | Lavoie et al. |
| 2014/0236532 A1 | 8/2014 | Trombley et al. |
| 2014/0249691 A1 | 9/2014 | Hafner et al. |
| 2014/0267688 A1 | 9/2014 | Aich et al. |
| 2014/0267689 A1 | 9/2014 | Lavoie |
| 2014/0267868 A1 | 9/2014 | Mazzola et al. |
| 2014/0267869 A1 | 9/2014 | Sawa |
| 2014/0277942 A1 | 9/2014 | Kyrtsos et al. |
| 2014/0297128 A1 | 10/2014 | Lavoie et al. |
| 2014/0297129 A1 | 10/2014 | Lavoie et al. |
| 2014/0303847 A1 | 10/2014 | Lavoie |
| 2014/0309888 A1 | 10/2014 | Smit et al. |
| 2014/0324295 A1 | 10/2014 | Lavoie |
| 2014/0343795 A1 | 11/2014 | Lavoie |
| 2014/0379217 A1 | 12/2014 | Rupp et al. |
| 2015/0025732 A1 | 1/2015 | Min et al. |
| 2015/0057903 A1 | 2/2015 | Rhode et al. |
| 2015/0066296 A1 | 3/2015 | Trombley et al. |
| 2015/0066298 A1 | 3/2015 | Sharma et al. |
| 2015/0120141 A1 | 4/2015 | Lavoie et al. |
| 2015/0134183 A1 | 5/2015 | Lavoie et al. |
| 2015/0138340 A1 | 5/2015 | Lavoie |
| 2015/0158527 A1 | 6/2015 | Hafner et al. |
| 2015/0203156 A1 | 7/2015 | Hafner et al. |
| 2015/0210317 A1 | 7/2015 | Hafner et al. |
| 2015/0217693 A1 | 8/2015 | Pliefke et al. |
| 2015/0232092 A1 | 8/2015 | Fairgrieve et al. |
| 2016/0009288 A1 | 1/2016 | Yu |
| 2016/0052548 A1 | 2/2016 | Singh et al. |

(56) References Cited

U.S. PATENT DOCUMENTS

FOREIGN PATENT DOCUMENTS

| | | |
|---|---|---|
| DE | 9208595 U1 | 8/1992 |
| DE | 10154612 A1 | 5/2003 |
| DE | 102005043466 A1 | 3/2007 |
| DE | 102005043467 A1 | 3/2007 |
| DE | 102005043468 A1 | 3/2007 |
| DE | 102006002294 A1 | 7/2007 |
| DE | 102006035021 A1 | 1/2008 |
| DE | 102007029413 A1 | 1/2009 |
| DE | 102006035021 B4 | 4/2010 |
| DE | 102008043675 A1 | 5/2010 |
| DE | 102009007990 A1 | 8/2010 |
| DE | 102009012253 A1 | 9/2010 |
| DE | 102010029184 | 11/2011 |
| DE | 102010029184 A1 | 11/2011 |
| EP | 0418653 A1 | 3/1991 |
| EP | 1361543 A2 | 11/2003 |
| EP | 1655191 A1 | 5/2006 |
| EP | 1810913 A1 | 7/2007 |
| EP | 2388180 A2 | 11/2011 |
| EP | 2644477 A1 | 10/2013 |
| FR | 2515379 A1 | 4/1983 |
| JP | 09267762 | 10/1997 |
| JP | 09267762 A | 10/1997 |
| JP | 10119739 A | 5/1998 |
| JP | 10119739 A | 12/1998 |
| JP | 2012166580 A | 6/2012 |
| JP | 2012166580 A | 9/2012 |
| WO | 0044605 A1 | 8/2000 |
| WO | 2012059207 A1 | 5/2012 |
| WO | 2012103193 A1 | 8/2012 |
| WO | 2013186208 A2 | 12/2013 |

OTHER PUBLICATIONS

Micah Steele, R. Brent Gillespie, Shared Control Between Human and Machine: Using a Haptic Steering Wheel to Aid in Land Vehicle Guidance, pp. 1-5, University of Michigan, Ann Arbor, Michigan.
Olof Enqvist, AFS-Assisted Trailer Reversing, Oct. 27, 2006, pp. 1-57, Division of Automatic Control, Department of Electrical Engineering, Linköpings Universitet, Linköping, Sweden.
2011 Ford Super Duty: Truck Technologies, Jul. 2011, pp. 1-2, media.ford.com.
Christian Lundquist, Wolffang Reinelt, Olof Enqvist, Back Driving Assistant for Passenger Cars with Trailer, Jan. 2006, pp. 1-8, ZF Lenksysteme GmbH, SAE International, Schwabisch Gmund, Germany.
Caterpillar, Understanding Tractor-Trailer Performance, 2006, pp. 1-28, Caterpillar.
Claudio Altafini, Alberto Speranzon, Karl Henrick Johansson, Hybrid Control of a Truck and Trailer Vehicle, 2002, pp. 1-14, Department of Signals, Sensors and Systems, Royal Institute of Technology, Springer-Verlag Berlin Heidelberg.
Ford, 2012 Edge, pp. 1-3, Preliminary 2012 RV & Trailer Towing Guide information, Ford | Lincoln Retailer Education & Training.
Zhe Leng, Mark A. Minor, Simple Tractor-Trailer Backing Control Law for Path Following with side-slope Compensation, 2011 IEEE International Conference on Robotics and Automation, May 9-13, 2011, pp. 2386-2391, Shanghai International Conference Center, Shanghai, China.
Guanrong Chen, Delin Zhang, Backing Up a Truck-Trailer with Suboptimal Distance Trajectories, Sep. 8-11, 1996,Proceedings of the Fifth IEEE International Conference Fuzzy Systems, pp. 1439-1445, vol. 2, IEEE, New Orleans, LA.
M.L. Payne, Control of a robot-trailer system using a single non-collocated sensor, Oct. 25-28, 2012, ECON 2012—38th Annual Conference on IEEE Industrial Electronics Society, pp. 2674-2679, Montreal, QC.
A.W. Divelbiss, J.T. Wen, Trajectory tracking control of a car-trailer system, May 1997, pp. 269-278, vol. 5, Issue 3, IEEE Transactions on Control Systems Technology, Reveo Corp., Hawthorne, NY.
C. Altafini, T.Theor., A. Speranzon, B. Wahlberg, A feedback control scheme for reversing a truck and trailer vehicle, Dec. 2001, pp. 915-922, vol. 17, Issue 6, IEEE Transactions on Robotics and Automation, IEEE.
D.W. Hudo, J.Y. Hung, D.M. Bevly, S. Millhouse, Effects of Sensor Placement and Errors on Path Following Control of a Mobile Robot-Trailer System, American Control Conference, 2007., Jul. 9-13, 2007, pp. 2165-2170, IEEE, New York, NY.
Cedric Pradalier, Kane Usher, Experiments in autonomous reversing of a tractor-trailer system, 6th International Conference on Field and Service Robotics—FSR 2007, France.
Cedric Pradalier, Kane Usher, Robust trajectory tracking for a reversing tractor-trailer system (draft), Journal of Field Robotics Special issue for selected papers from Field and Service Robotics conference, Mar. 2008, pp. 1-16, Australia.
Karios Autonomi, Optionally Unmanned Ground Systems for any Steering-Wheel Based Vehicle or Vessel, Kairos Autonomi, pp. 1-2.
G S Haviland, Automatic Brake Control for Trucks—What Good Is It?, TRID, Monograph, 1968-9, pp. 12, National Academy of Sciences, Washington, D.C.
"Ford Super Duty: Truck Technologies", Brochure, Sep. 2011, pp. 1-2.
C. Lundquist; W. Reinelt; O. Enqvist, "Back Driving Assistant for Passenger Cars with Trailer", ZF Lenksysteme GmbH, Schwäbisch Gmünd, Germany, 2006 (SAE Int'l) Jan. 2006, pp. 1-8.
"Understanding Tractor-Trailer Performance", Caterpillar, 2006, pp. 1-28.
Zhe Leng; Minor, M., "A Simple Tractor-Trailer Backing Control Law for Path Following", IEEE, Intelligent Robots and Systems (IROS) IEEE/RSJ International Conference, Oct. 2010, pp. 1-2.
Guanrong, Chen; Delin, Zhang; "Backing up a Truck-Trailer with Suboptimal Distance Trajectories", IEEE, Proceedings of the Fifth IEEE International Conference, vol. 2, Aug. 6, 2002, New Orleans, LA, ISBN:0-7803-3645-3, pp. 1439-1445.
Payne, M.L.;Hung, J.Y, and Bevy, D.M; "Control of a Robot-Trailer System Using a Single Non-Collacted Sensor", IEEE, 38th Annual Conference on IEEE Industrial Electronics Society, Oct. 25-28, 2012; pp. 2674-2679.
J. Roh; H. Lee; W. Chung, "Control of a Car with a Trailer Using the Driver Assistance System", IEEE, International Conference on Robotics and Biomimetics; Phuket, Thailand, Dec. 2011, pp. 2890-2895.
Altafini, C.; Speranzon, A.; Wahlberg, B., "A Feedback Control Scheme for Reversing a Truck and Trailer Vehicle", IEEE, Robotics and Automation, IEEE Transactions, Dec. 2001, vol. 17, No. 6, pp. 1-2.
Hodo, D. W.; Hung, J.Y.; Bevly, D. M.; Millhouse, S., "Effects of Sensor Placement and Errors on Path Following Control of a Mobile Robot-Trailer System", IEEE, American Control Conference, Jul. 2007, pp. 1-1.
Claudio Altafini, Alberto Speranzon, and Karl Henrik Johansson, "Hybrid Control of a Truck and Trailer Vehicle", Springer-Verlag Berlin Heidelberg, HSCC 2002, LNCS 2289; 2002, pp. 21-34.
Cedric Pradalier and Kane Usher, "Robust Trajectory Tracking for a Reversing Tractor-Trailer System", (Draft), Field and Service Robotics Conference, CSIRO ICT Centre, Jul. 2007, 16 pages.
"2012 Edge—Trailer Towing Selector", Brochure, Preliminary 2012 RV & Trailer Towing Guide Information, pp. 1-3.
"Optionally Unmanned Ground Systems for any Steering-Wheel Based Vehicle" Universal. Unmanned., Kairos Autonomi, website: http://www.kairosautonomi.com/pronto4_system.html[Sep. 26, 2014 3:22:48 PM], 2008, pp. 1-2.
Haviland, G S, "Automatic Brake Control for Trucks—What Good Is It?", TRID, Society of Automotive Engineers, Sep. 1968, pp. 1-1.
Divelbiss, A.W.; Wen, J.T.; "Trajectory Tracking Control of a Car-Trailer System", IEEE, Control Systems Technology, Aug. 6, 2002, vol. 5, No. 3, pp. 269-278.
Olof Enqvist, "AFS-Assisted Trailer Reversing," Institutionen för systemteknik Deartment of Electrical Engineering, Jan. 27, 2006, pp. 1-57.

(56) References Cited

OTHER PUBLICATIONS

Cedric Pradalier and Kane Usher, "Experiments in Autonomous Reversing of a Tractor-Trailer System", 6th International Conference on Field and Service Robotics, inria-00195700, Version 1, Dec. 2007, pp. 1-10.

Micah Steele, R. Brent Gillespie, "Shared Control Between Human and Machine: Using a Haptic Steering Wheel to Aid in Land Vehicle Guidance", University of Michigan, pp. 1-5.

M. Khatib, H. Jaouni, R. Chatila, and J.P. Laumond; "Dynamic Path Modification for Car-Like Nonholonomic Mobile Robots," IEEE, International Conference on Robotics and Automation, Albuquerque, New Mexico, Apr. 1997, 6 pages.

SH. Azadi, H.R. Rezaei Nedamani, and R. Kazemi, "Automatic Parking of an Articulated Vehicle Using ANFIS", Global Journal of Science, Engineering and Technology (ISSN: 2322-2441), 2013, pp. 93-104, Issue No. 14.

F. Cuesta and A. Ollero, "Intelligent System for Parallel Parking of Cars and Tractor-Trailers", Intelligent Mobile Robot Navigation, STAR, 2005, pp. 159-188, Springer-Verlag Berlin Heidelberg.

\* cited by examiner

TRAILER BACKUP ASSIST SYSTEM WITH ACTIVE TRAILER BRAKING FOR CURVATURE CONTROL

FIELD OF THE INVENTION

The disclosure made herein relates generally to driver assist and active safety technologies in vehicles, and more particularly to a trailer backup assist system that is configured with active trailer braking for improved trailer guidance.

BACKGROUND OF THE INVENTION

Reversing a vehicle while towing a trailer can be challenging for many drivers, particularly for drivers that drive with a trailer on an infrequent basis or with various types of trailers. One reason for such difficulty may be that backing a vehicle with an attached trailer requires steering inputs that are opposite to steering inputs when backing the vehicle without a trailer attached to the vehicle. Another reason for such difficulty may be that small errors in steering while backing a vehicle with an attached trailer are amplified, which may cause the trailer to quickly depart from a desired path. Yet an additional reason backing a trailer can prove to be difficult is the need to control the vehicle in a manner that limits the potential for a jackknife condition to occur. These difficulties may also be experienced and in some instances increased when attempting to quickly achieve a tight turning radius or when switching between various trailers that have a wide variance in how they react to similar steering inputs, such as how a relatively short trailer may react quicker to a steering change than a longer trailer.

SUMMARY OF THE INVENTION

According to one aspect of the present invention, a trailer backup assist system for a vehicle includes a trailer having a braking system. The trailer backup assist system also includes a steering input device that provides a desired curvature for the trailer. A controller of the trailer backup assist system generates a steering command for the vehicle and an actuation command for the braking system to guide the trailer on the desired curvature and to reduce a rearward travel distance to achieve the desired curvature.

According to another aspect of the present invention, a method for reversing a trailer having a braking system provides a step of receiving a desired curvature of the trailer. The method also provides a step of sensing a hitch angle between the trailer and a vehicle. In addition, the method provides a step of generating a steering command for the vehicle to guide the trailer on the desired curvature based on the hitch angle. The method further provides a step of generating an actuation command for the braking system to reduce a rearward travel distance to achieve the desired curvature.

According to a further aspect of the present invention, a trailer backup assist system for a vehicle includes a trailer coupled with the vehicle. The trailer of the trailer backup assist system has a braking system. The trailer backup assist system also includes a sensor that senses a hitch angle between the vehicle and the trailer. In addition, the trailer backup assist system includes a steering input device that provides a desired curvature of the trailer. The trailer backup assist system further includes a controller that generates a steering command based on the hitch angle for the vehicle to guide the trailer on the desired curvature and an actuation command for the braking system to reduce a rearward travel distance for the trailer to achieve the desired curvature.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
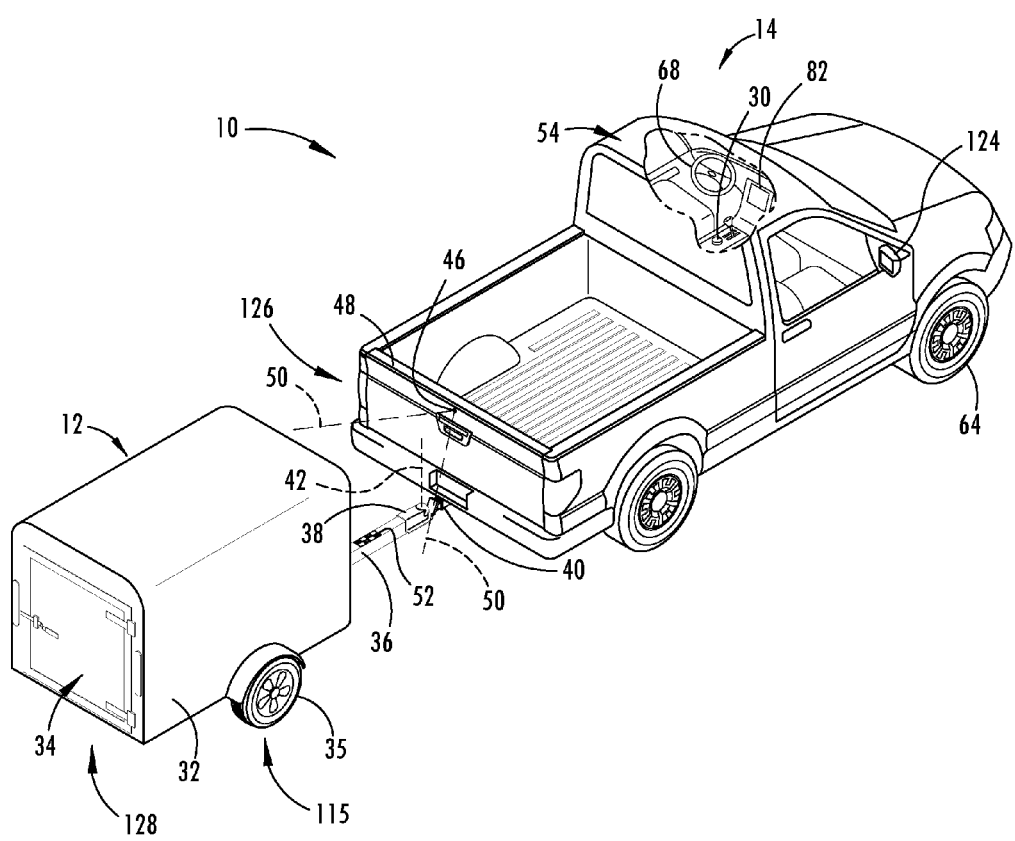
FIG. 1 is a top perspective view of a vehicle attached to a trailer with one embodiment of a hitch angle sensor for operating a trailer backup assist system.

For purposes of description herein, it is to be understood that the disclosed trailer backup assist system and the related methods may assume various alternative embodiments and orientations, except where expressly specified to the contrary. It is also to be understood that the specific devices and processes illustrated in the attached drawings, and described in the following specification are simply exemplary embodiments of the inventive concepts defined in the appended claims. While various aspects of the trailer backup assist system and the related methods are described with reference to a particular illustrative embodiment, the disclosed invention is not limited to such embodiments, and additional modifications, applications, and embodiments may be implemented without departing from the disclosed invention. Hence, specific dimensions and other physical characteristics relating to the embodiments disclosed herein are not to be considered as limiting, unless the claims expressly state otherwise.

Referring to FIGS. 1-13, reference numeral 10 generally designates a trailer backup assist system for controlling a backing path of a trailer 12 attached to a vehicle 14 by allowing a driver of the vehicle 14 to specify a desired curvature 26 of the backing path of the trailer 12. In one embodiment, the trailer backup assist system 10 automatically steers the vehicle 14 to guide the trailer 12 on the desired curvature or backing path 26 as a driver uses the accelerator and brake pedals to control the reversing speed of the vehicle 14. The trailer 12, in some embodiments, may include a braking system 13 for braking wheels 15 of the trailer 12 independent of the vehicle brake control system 72. To monitor the position of the trailer 12 relative to the vehicle 14, the trailer backup assist system 10 may include a sensor system 16 that senses a hitch angle γ between the trailer 12 and the vehicle 14, which may be referred to as a hitch angle sensor 44 or hitch sensor. In addition, the trailer backup assist system 10 may include a steering input device 18, such as a mode selection device 20 or a rotatable knob 30, for a driver to provide the desired curvature or backing path 26 of the trailer 12. Upon inputting the desired curvature or backing path 26, a steering command may be generated based on the sensed hitch angle γ and a kinematic relationship between the trailer 12 and the vehicle 14 to guide the trailer 12 on the desired curvature or backing path 26. A curvature controller 28 of the trailer backup assist system 10 may also generate an actuation command for the braking system of the trailer 12 to guide the trailer 12 on the desired curvature or backing path 26. By actuating the braking system of the trailer 12, the controller 28 reduces a rearward travel distance to achieve the desired curvature or backing path 26. It is contemplated that additional embodiments of the trailer backup assist system 10 may also actuate the braking system 13 of the trailer 12 to increase the rearward travel distance to achieve the desired curvature or backing path 26, as disclosed in more detail herein.

With reference to the embodiment shown in FIG. 1, the vehicle 14 is a pickup truck embodiment that is equipped with one embodiment of the trailer backup assist system 10 for controlling the backing path 26 of the trailer 12 that is attached to the vehicle 14. Specifically, the vehicle 14 is pivotally attached to one embodiment of the trailer 12 that has a box frame 32 with an enclosed cargo area 34, a single axle having a right wheel assembly 35 and a left wheel assembly, and a tongue 36 longitudinally extending forward from the enclosed cargo area 34. The left and right wheel assemblies 35 include electrical friction brakes that each have a drum and electrically actuatable shoes that are configured to slow or stop rotational movement of the associated wheel 15 upon engagement with the drum. It is conceivable that the left and right wheel assemblies 35 may additionally or alternatively include other types of brake assemblies, such as hydraulic brake actuators. The illustrated trailer 12 also has a trailer hitch connector in the form of a coupler assembly 38 that is connected to a vehicle hitch connector in the form of a hitch ball 40. The coupler assembly 38 latches onto the hitch ball 40 to provide a pivoting ball joint connection 42 that allows for articulation of the hitch angle γ. It should be appreciated that additional embodiments of the trailer 12 may alternatively couple with the vehicle 14 to provide a pivoting connection, such as by connecting with a fifth wheel connector. It is also contemplated that additional embodiments of the trailer may include more than one axle and may have various shapes and sizes configured for different loads and items, such as a boat trailer or a flatbed trailer.

Still referring to FIG. 1, the sensor system 16 in the illustrated embodiment includes a vision based hitch angle sensor 44 for sensing the hitch angle γ between the vehicle 14 and the trailer 12. The illustrated hitch angle sensor 44 employs a camera 46 (e.g. video imaging camera) that may be located proximate an upper region of the vehicle tailgate 48 at the rear of the vehicle 14, as shown, such that the camera 46 may be elevated relative to the tongue 36 of the trailer 12. The illustrated camera 46 has an imaging field of view 50 located and oriented to capture one or more images of the trailer 12, including a region containing one or more desired target placement zones for at least one target 52 to be secured. Although it is contemplated that the camera 46 may capture images of the trailer 12 without a target 52 to determine the hitch angle γ, in the illustrated embodiment, the trailer backup assist system 10 includes a target 52 placed on the trailer 12 to allow the trailer backup assist system 10 to utilize information acquired via image acquisition and processing of the target 52. For instance, the illustrated camera 46 may include a video imaging camera that repeatedly captures successive images of the trailer 12 that may be processed to identify the target 52 and its location on the trailer 12 for determining movement of the target 52 and the trailer 12 relative to the vehicle 14 and the corresponding hitch angle γ. It should also be appreciated that the camera 46 may include one or more video imaging cameras and may be located at other locations on the vehicle 14 to acquire images of the trailer 12 and the desired target placement zone, such as on a passenger cab 54 of the vehicle 14 to capture images of a gooseneck trailer. Furthermore, it is contemplated that additional embodiments of the hitch angle sensor 44 and the sensor system 16 for providing the hitch angle γ may include one or a combination of a potentiometer, a magnetic-based sensor, an optical sensor, a proximity sensor, a rotational sensor, a capacitive sensor, an inductive sensor, or a mechanical based sensor, such as a mechanical sensor assembly mounted to the pivoting ball joint connection 42, a yaw rate sensor on the trailer 12 and the vehicle 14, energy transducers of a reverse aid system, a blind spot system, and/or a cross traffic alert system, and other conceivable sensors or indicators of the hitch angle γ to supplement or be used in place of the vision based hitch angle sensor 44.

Figure 2:
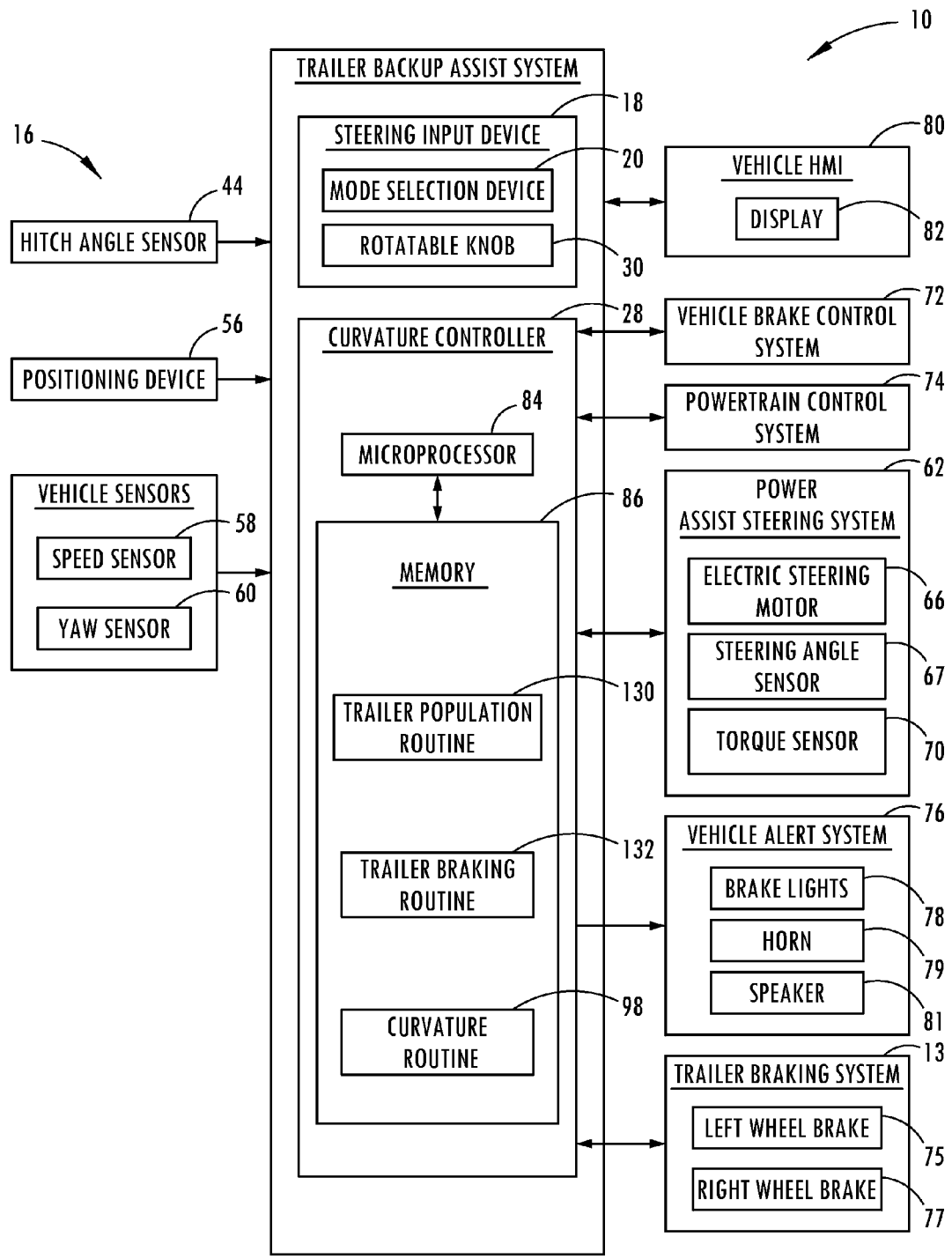
FIG. 2 is a block diagram illustrating one embodiment of the trailer backup assist system having a steering input device, a curvature controller, and a trailer braking system.

With reference to the embodiment of the trailer backup assist system 10 shown in FIG. 2, the hitch angle sensor 44 provides the sensed hitch angle γ to the trailer backup assist system 10. Similarly, the illustrated embodiment of the trailer backup assist system 10 receives vehicle status-related information from additional sensors and devices. This information includes positioning information from a positioning device 56, which may include a global positioning system (GPS) on the vehicle 14 or a handled device, to determine a coordinate location of the vehicle 14 and the trailer 12 based on the location of the positioning device 56 with respect to the trailer 12 and/or the vehicle 14 and based on the sensed hitch angle γ. The positioning device 56 may additionally or alternatively include a dead reckoning system for determining the coordinate location of the vehicle 14 and the trailer 12 within a localized coordinate system based at least on vehicle speed, steering angle, and hitch angle γ. Other vehicle information received by the trailer backup assist system 10 may include a speed of the vehicle 14 from a speed sensor 58 and a yaw rate of the vehicle 14 from a yaw sensor 60. It is contemplated that in additional embodiments the hitch angle sensor 44 and other vehicle sensors and devices may provide sensor signals or other information, such as proximity sensor signals or successive images of the trailer 12, that a controller of the trailer backup assist system 10 may process with various routines to determine a value or an indicator, such as a hitch angle value or a range of hitch angles γ.

As further shown in FIG. 2, one embodiment of the trailer backup assist system 10 is in communication with a power assist steering system 62 of the vehicle 14 to operate steered wheels 64 (FIG. 1) of the vehicle 14 for moving the vehicle 14 in such a manner that the trailer 12 reacts in accordance with the desired curvature of the trailer 12. In the illustrated embodiment, the power assist steering system 62 is an electric power-assisted steering (EPAS) system that includes an electric steering motor 66 for turning the steered wheels 64 to a steering angle based on a steering command, whereby the steering angle is sensed by a steering angle sensor 67 of the power assist steering system 62. The steering command may be provided by the trailer backup assist system 10 for autonomously steering during a backup maneuver and may alternatively be provided manually via a rotational position (e.g., steering wheel angle) of a steering wheel 68 (FIG. 1). However, in the illustrated embodiment, the steering wheel 68 of the vehicle 14 is mechanically coupled with the steered wheels 64 of the vehicle 14, such that the steering wheel 68 moves in concert with steered wheels 64, preventing manual intervention with the steering wheel 68 during autonomous steering. More specifically, a torque sensor 70 is provided on the power assist steering system 62 that senses torque on the steering wheel 68 that is not expected from autonomous control of the steering wheel 68 and therefore indicative of manual intervention, whereby the trailer backup assist system 10 may alert the driver to discontinue manual intervention with the steering wheel 68 and/or discontinue autonomous steering.

In alternative embodiments, some vehicles have a power assist steering system 62 that allows a steering wheel 68 to be partially decoupled from movement of the steered wheels 64 of such a vehicle. Accordingly, the steering wheel 68 can be rotated independent of the manner in which the power assist steering system 62 of the vehicle controls the steered wheels 64 (e.g., autonomous steering as commanded by the trailer backup assist system 10). As such, in these types of vehicles where the steering wheel 68 can be selectively decoupled from the steered wheels 64 to allow independent operation thereof, the steering wheel 68 may be used as a steering input device 18 for the trailer backup assist system 10, as disclosed in greater detail herein.

Referring again to the embodiment illustrated in FIG. 2, the power assist steering system 62 provides the curvature controller 28 of the trailer backup assist system 10 with information relating to a rotational position of steered wheels 64 of the vehicle 14, including a steering angle. The curvature controller 28 in the illustrated embodiment processes the current steering angle, in addition to other vehicle 14 and trailer 12 conditions to guide the trailer 12 along the desired backing path 26 and/or desired curvature. It is conceivable that the trailer backup assist system 10, in additional embodiments, may be an integrated component of the power assist steering system 62. For example, the power assist steering system 62 may include a trailer backup assist algorithm for generating vehicle steering information and commands as a function of all or a portion of information received from the steering input device 18, the hitch angle sensor 44, the power assist steering system 62, a vehicle brake control system 72, a powertrain control system 74, and other vehicle sensors and devices.

As also illustrated in FIG. 2, the vehicle brake control system 72 may also communicate with the curvature controller 28 to provide the trailer backup assist system 10 with braking information, such as wheel speed, and to receive braking commands from the curvature controller 28. For instance, vehicle speed information can be determined from individual wheel speeds as monitored by the brake control system 72. Vehicle speed may also be determined from the powertrain control system 74, the speed sensor 58, and the positioning device 56, among other conceivable means. In some embodiments, individual wheel speeds can also be used to determine a vehicle yaw rate, which can be provided to the trailer backup assist system 10 in the alternative or in addition to the yaw sensor 60, for use in determining the vehicle steering commands. In certain embodiments, the trailer backup assist system 10 can provide vehicle braking information to the brake control system 72 for allowing the trailer backup assist system 10 to control braking of the vehicle 14 during backing of the trailer 12. For example, the trailer backup assist system 10 in some embodiments may regulate speed of the vehicle 14 during backing of the trailer 12, which can reduce the potential for unacceptable trailer backup conditions. Examples of unacceptable trailer backup conditions include, but are not limited to, a vehicle 14 over speed condition, a high hitch angle rate, trailer angle dynamic instability, a calculated theoretical trailer jackknife condition (defined by a maximum vehicle steering angle, drawbar length, tow vehicle wheelbase, and an effective trailer length), or physical contact jackknife limitation (defined by an angular displacement limit relative to the vehicle 14 and the trailer 12), and the like. It is disclosed herein that the trailer backup assist system 10 can issue an alert signal corresponding to a notification of an actual, impending, and/or anticipated unacceptable trailer backup condition.

The powertrain control system 74, as shown in the embodiment illustrated in FIG. 2, may also interact with the trailer backup assist system 10 for regulating speed and acceleration of the vehicle 14 during backing of the trailer 12. As mentioned above, regulation of the speed of the vehicle 14 as instructed by a speed command from the controller 28 may be necessary to limit the potential for unacceptable trailer backup conditions such as, for example, jackknifing and trailer angle dynamic instability. Similar to high-speed considerations as they relate to unacceptable trailer backup conditions, high acceleration and high dynamic driver curvature requests can also lead to such unacceptable trailer backup conditions.

The embodiment of the trailer backup assist system 10 shown in FIG. 2 also includes the trailer braking system 13 that communicates brake status information to the curvature controller 28 and receives actuation commands for braking one or more wheels of the trailer 12. More specifically, the illustrated embodiment of the trailer braking system 13 has a left wheel brake 75 and a right wheel brake 77, which are independently capable of providing brake status information and receiving an actuation command. The wheel brakes 75, 77 on the trailer 12 may be one or a combination of electrical friction brakes, hydraulic brake actuators, or other conceivable brake assemblies. With respect to brake status information that may be provided to the curvature controller 28 from the trailer braking system 13, it is conceivable that speed of the trailer wheels 15 may be sensed and provided to the curvature controller 28. Similar to such information for the vehicle, trailer wheel speed may be used to determine the trailer and vehicle speed, as well as a trailer yaw rate. The trailer yaw rate, in combination with the vehicle yaw rate, may further be used to determine the hitch angle γ. In some embodiments, the trailer braking system 13 may be partially or completely integrated with the vehicle brake control system 72 or other sensors, devices, or control systems of the vehicle 14 to allow the trailer backup assist system 10 to control braking of the trailer 12 and the vehicle 14.

As also shown in FIG. 2, the illustrated embodiment of the trailer braking system 13 allows an actuation command to include a specific braking force for one wheel brake or each wheel brake 75, 77, such as a percentage of available braking force. It is also contemplated that the actuation command may generally comprise an on command to apply a preset braking force and an off command to remove the braking force. For different types of trailer braking systems, such as hydraulic trailer brakes or multiple axle arrangements, it is understood that the actuation commands may be configured to correspond with the necessary brake system inputs. As disclosed in further detail below, the trailer backup assist system 10 may actuate the wheel brakes 75, 77 of the trailer braking system 13 when the vehicle 14 is reversing to alter the trailer's response to movements of the vehicle 14, such as braking a wheel 15 on an inside of the desired curvature to reduce a rearward travel distance to achieve the desired curvature. Stated differently, the trailer braking system 13 may actuate a wheel brake 75, 77 of the trailer 12 to cause the hitch angle γ to change at a modified rate, such as at a faster rate when braking a wheel on an inside of the desired curvature or a slower rate when braking a wheel on an outside of the desired curvature. In addition to the trailer braking system 13 providing increased responsiveness to vehicle movements for guiding the trailer 12 on a desired curvature or backing path 26, it is contemplated that trailer braking system 13 may also be used to reduce the potential for unacceptable trailer backup conditions. Examples of unacceptable trailer backup conditions include, but are not limited to, an over speed condition, a high hitch angle rate, trailer angle dynamic instability, a calculated theoretical trailer jackknife condition, a physical contact jackknife limitation, the trailer 12 or the vehicle 14 approaching physical contact with an object, and the like. It is disclosed herein that the trailer backup assist system 10 can issue an alert signal corresponding to a notification of an actual, impending, and/or anticipated unacceptable trailer backup condition.

With continued reference to FIG. 2, the trailer backup assist system 10 in the illustrated embodiment may communicate with one or more devices, including a vehicle alert system 76, which may prompt visual, auditory, and tactile warnings. For instance, vehicle brake lights 78 and vehicle emergency flashers may provide a visual alert and a vehicle horn 79 and/or speaker 81 may provide an audible alert. Additionally, the trailer backup assist system 10 and/or vehicle alert system 76 may communicate with a human machine interface (HMI) 80 for the vehicle 14. The HMI 80 may include a vehicle display 82, such as a center-stack mounted navigation or entertainment display (FIG. 1). Further, the trailer backup assist system 10 may communicate via wireless communication with another embodiment of the HMI 80, such as with one or more handheld or portable devices, including one or more smartphones. The portable device may also include the display 82 for displaying one or more images and other information to a user. For instance, the portable device may display one or more images of the trailer 12 and the target location within a desired target placement zone on display. In addition, the portable device may provide feedback information, such as visual, audible, and tactile alerts.

As further illustrated in FIG. 2, the trailer backup assist system 10 includes a steering input device 18 that is connected to the curvature controller 28 for allowing communication of information therebetween. It is disclosed herein that the steering input device 18 can be coupled to the curvature controller 28 in a wired or wireless manner. The steering input device 18 provides the trailer backup assist system 10 with information defining the desired backing path 26 of travel of the trailer 12 for the curvature controller 28 to process and generate steering commands. Namely, the steering input device 18 provides a desired curvature of the desired backing path 26 of travel of the trailer 12. Also, the trailer steering commands can include information relating to a commanded change in the path of travel, such as a change in radius of the backing path 26 (e.g., the curvature) and information relating to an indication that the trailer 12 is to travel along a path defined by a longitudinal centerline axis of the trailer 12 (i.e., along a substantially straight path of travel or zero curvature). As will be discussed below in more detail, the steering input device 18 according to the illustrated embodiment may include the mode selection device 20 for selecting the longitudinal direction 22 of the trailer 12, the longitudinal direction 24 of the vehicle 14, or the curvature based on the present hitch angle γ or intervention from another steering input device 18, such as the rotatable knob 30. Accordingly, the steering input device 18 in the illustrated embodiment may also include a rotational control input device for allowing a driver of the vehicle 14 to command desired trailer steering actions or otherwise select the desired curvature. For instance, the rotational control input device may be a rotatable knob 30, which can be rotatable about a rotational axis extending through a top surface or face of the knob. In other embodiments, the rotatable knob 30 may be rotatable about a rotational axis extending substantially parallel to a top surface or face of the rotatable knob 30. Furthermore, the steering input device 18, according to additional embodiments, may include alternative devices for providing a desired curvature or other information defining a desired backing path 26, such as a joystick, depressible buttons, sliding input devices, various controls on a portable device, various user interfaces on a touch-screen display, vision based systems for receiving gestures, a trajectory planner or other programmable route system, and other conceivable input devices as generally understood by one having ordinary skill in the art.

Still referring to the embodiment shown in FIG. 2, the curvature controller 28 is configured with a microprocessor 84 to process logic and routines stored in memory 86 that receive information from the steering input device 18, the hitch angle sensor 44, the power assist steering system 62, the vehicle brake control system 72, the trailer braking system 13, the powertrain control system 74, and other vehicle sensors and devices. The curvature controller 28 may generate trailer brake actuation commands and vehicle steering information and commands as a function of all or a portion of the information received from the steering input device 18, the hitch angle sensor 44, the power assist steering system 62, the vehicle brake control system 72, the trailer braking system 13, the powertrain control system 74, and other vehicle sensors and devices. Thereafter, the trailer brake actuation commands may be provided to the trailer braking system 13 and the vehicle steering information and commands may be provided to the power assist steering system 62 for affecting steering of the vehicle 14 to achieve a commanded path of travel for the trailer 12. The curvature controller 28 may include the microprocessor 84 and/or other analog and/or digital circuitry for processing one or more routines. Also, the curvature controller 28 may include the memory 86 for storing one or more routines, including a trailer population routine 130, a trailer braking routine 132, and a curvature routine 98. It should be appreciated that the curvature controller 28 may be a stand-alone dedicated controller or may be a shared controller integrated with other control functions, such as integrated with the sensor system 16, the power assist steering system 62, and other conceivable onboard or off-board vehicle control systems.

Figure 3:
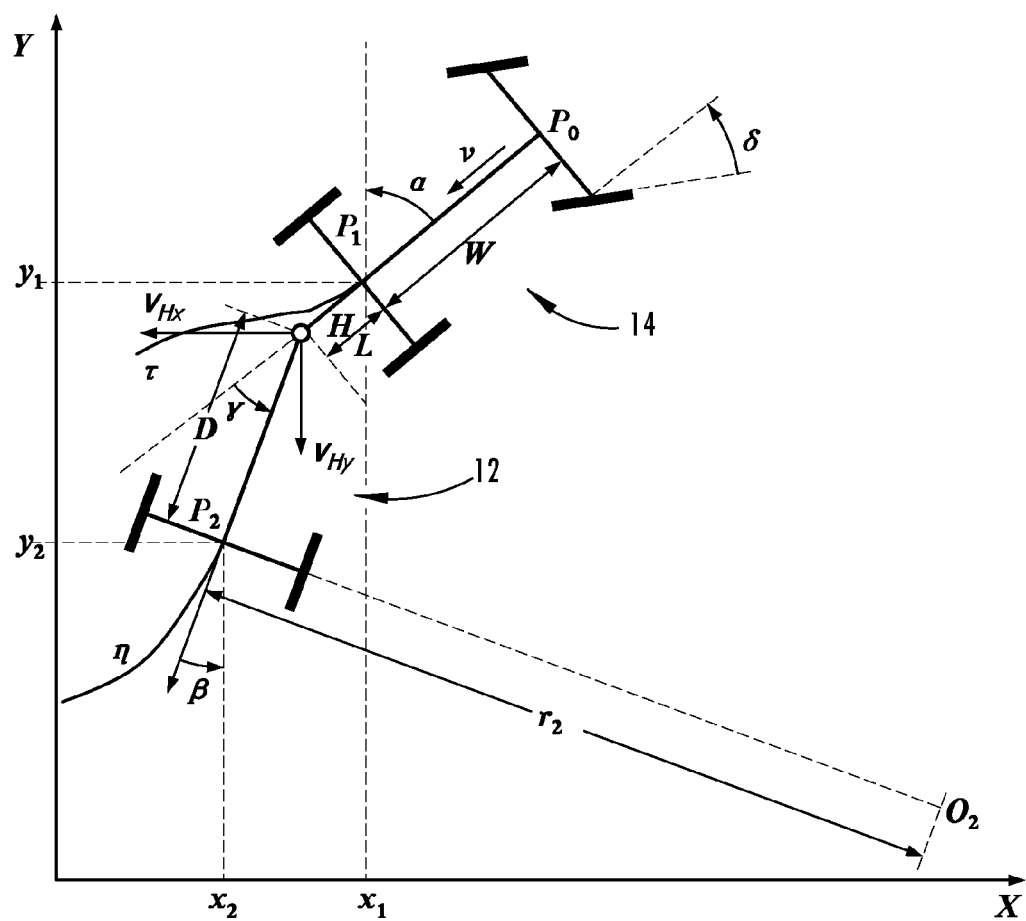
FIG. 3 is a schematic diagram that illustrates the geometry of a vehicle and a trailer overlaid with a two-dimensional x-y coordinate system, identifying variables used to determine a kinematic relationship of the vehicle and the trailer for the trailer backup assist system, according to one embodiment.

With reference to FIG. 3, we now turn to a discussion of vehicle and trailer information and parameters used to calculate a kinematic relationship between a curvature of a path of travel of the trailer 12 and the steering angle of the vehicle towing the trailer 12, which can be desirable for a trailer backup assist system 10 configured in accordance with some embodiments, including for use by a curvature routine 98 of the curvature controller 28 in one embodiment. To achieve such a kinematic relationship, certain assumptions may be made with regard to parameters associated with the vehicle/trailer system. Examples of such assumptions include, but are not limited to, the trailer 12 being backed by the vehicle 14 at a relatively low speed, wheels of the vehicle 14 and the trailer 12 having negligible (e.g., no) slip, tires of the vehicle 14 having negligible (e.g., no) lateral compliance, tires of the vehicle 14 and the trailer 12 having negligible (e.g., no) deformation, actuator dynamics of the vehicle 14 being negligible, and the vehicle 14 and the trailer 12 exhibiting negligible (e.g., no) roll or pitch motions, among other conceivable factors with the potential to have an effect on controlling the trailer 12 with the vehicle 14.

As shown in FIG. 3, for a system defined by a vehicle 14 and a trailer 12, the kinematic relationship is based on various parameters associated with the vehicle 14 and the trailer 12. These parameters include:

δ: steering angle at steered front wheels of the vehicle 14;
α: yaw angle of the vehicle 14;
β: yaw angle of the trailer 12;
γ: hitch angle (γ=β−α);
W: wheel base of the vehicle 14;
L: length between hitch point and rear axle of the vehicle 14;
D: distance between hitch point and axle of the trailer 12 or effective axle for a multiple axle trailer 12 (axle length may be an equivalent); and
$r_2$: curvature radius for the trailer 12.

One embodiment of a kinematic relationship between trailer path radius of curvature $r_2$ at the midpoint of an axle of the trailer 12, steering angle δ of the steered wheels 64 of the vehicle 14, and the hitch angle γ can be expressed in the equation provided below. As such, if the hitch angle γ is provided, the trailer path curvature $\kappa_2$ can be controlled based on regulating the steering angle δ (where $\dot{\beta}$ is trailer yaw rate and $\dot{\eta}$ is trailer velocity).

$$\kappa_2 = \frac{1}{r_2} = \frac{\dot{\beta}}{\dot{\eta}} = \frac{\left(W + \frac{KV^2}{g}\right)\sin\gamma + L\cos\gamma\tan\delta}{D\left(\left(W + \frac{KV^2}{g}\right)\cos\gamma - L\sin\gamma\tan\delta\right)}$$

This relationship can be expressed to provide the steering angle δ as a function of trailer path curvature $\kappa_2$ and hitch angle γ.

$$\delta = \tan^{-1}\left(\frac{\left(W + \frac{KV^2}{g}\right)[\kappa_2 D\cos\gamma - \sin\gamma]}{DL\kappa_2\sin\gamma + L\cos\gamma}\right) = F(\gamma, \kappa_2, K)$$

Accordingly, for a particular vehicle and trailer combination, certain parameters (e.g., D, W and L) of the kinematic relationship are constant and assumed known. V is the vehicle longitudinal speed and g is the acceleration due to gravity. K is a speed dependent parameter which when set to zero makes the calculation of steering angle independent of vehicle speed. For example, vehicle-specific parameters of the kinematic relationship can be predefined in an electronic control system of the vehicle 14 and trailer-specific parameters of the kinematic relationship can be inputted by a driver of the vehicle 14, determined from sensed trailer behavior in response to vehicle steering commands, or otherwise determined from signals provided by the trailer 12. Trailer path curvature $\kappa_2$ can be determined from the driver input via the steering input device 18. Through the use of the equation for providing steering angle, a corresponding steering command can be generated by the curvature routine 98 for controlling the power assist steering system 62 of the vehicle 14.

In an additional embodiment, an assumption may be made by the curvature routine 98 that a longitudinal distance L between the pivoting connection and the rear axle of the vehicle 14 is equal to zero for purposes of operating the trailer backup assist system 10 when a gooseneck trailer or other similar trailer is connected with the a hitch ball or a fifth wheel connector located over a rear axle of the vehicle 14. The assumption essentially assumes that the pivoting connection with the trailer 12 is substantially vertically aligned with the rear axle of the vehicle 14. When such an assumption is made, the curvature controller 28 may generate the steering angle command for the vehicle 14 as a function independent of the longitudinal distance L between the pivoting connection and the rear axle of the vehicle 14. It is appreciated that the gooseneck trailer mentioned generally refers to the tongue configuration being elevated to attach with the vehicle 14 at an elevated location over the rear axle, such as within a bed of a truck, whereby embodiments of the gooseneck trailer may include flatbed cargo areas, enclosed cargo areas, campers, cattle trailers, horse trailers, lowboy trailers, and other conceivable trailers with such a tongue configuration.

Figure 4:
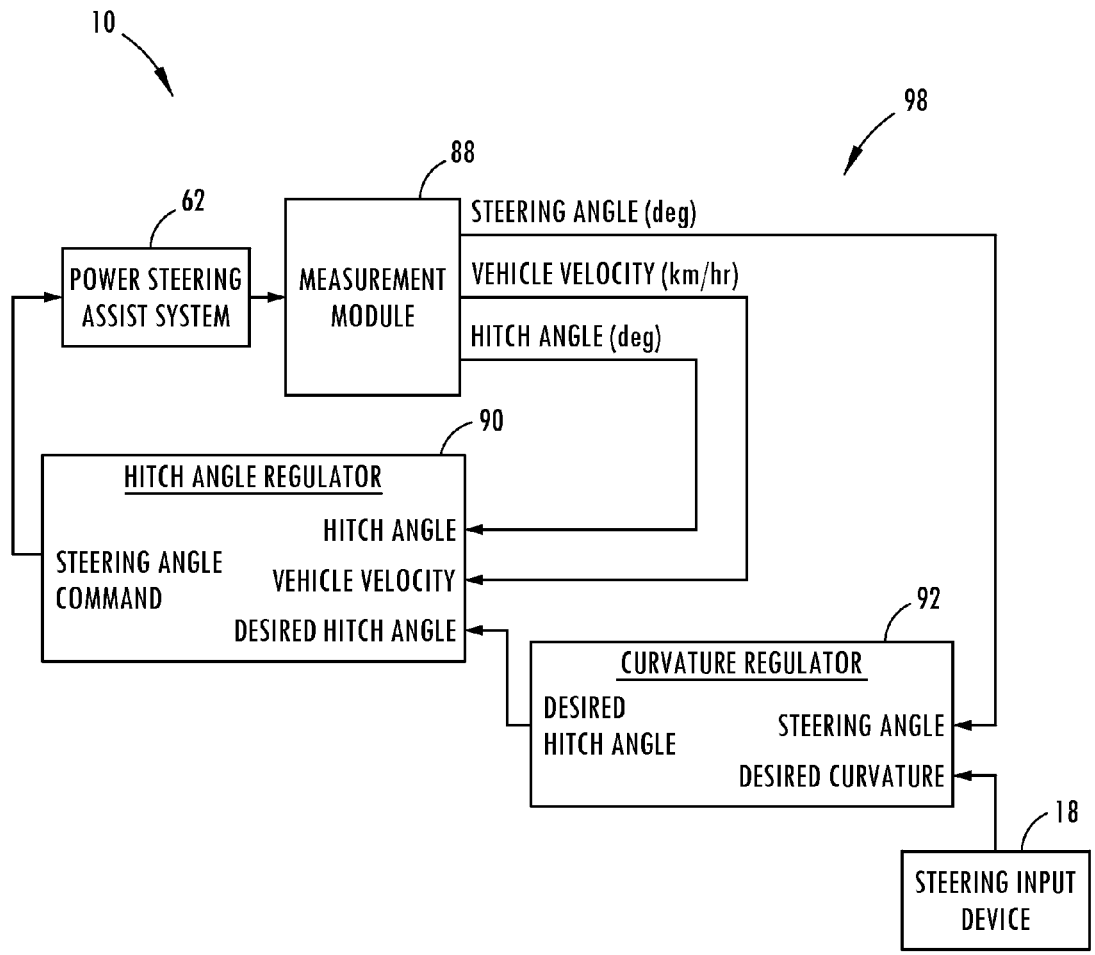
FIG. 4 is a schematic block diagram illustrating portions of a curvature controller, according to an additional embodiment, and other components of the trailer backup assist system, according to such an embodiment.

Yet another embodiment of the curvature routine 98 of the trailer backup assist system 10 is illustrated in FIG. 4, showing the general architectural layout whereby a measurement module 88, a hitch angle regulator 90, and a curvature regulator 92 are routines that may be stored in the memory 86 of the curvature controller 28. In the illustrated layout, the steering input device 18 provides a desired curvature $\kappa_2$ value to the curvature regulator 92 of the curvature controller 28, which may be determined from the desired backing path 26 that is input with the steering input device 18. The curvature regulator 92 computes a desired hitch angle γ(d) based on the current desired curvature $\kappa_2$ along with the steering angle δ provided by a measurement module 88 in this embodiment of the curvature controller 28. The measurement module 88 may be a memory device separate from or integrated with the curvature controller 28 that stores data from sensors of the trailer backup assist system 10, such as the hitch angle sensor 44, the vehicle speed sensor 58, the steering angle sensor 67, or alternatively the measurement module 88 may otherwise directly transmit data from the sensors without functioning as a memory device. Once the desired hitch angle γ(d) is computed by the curvature regulator 92 the hitch angle regulator 90 generates a steering angle command based on the computed desired hitch angle γ(d) as well as a measured hitch angle γ(m) and a current velocity of the vehicle 14. The steering angle command is supplied to the power assist steering system 62 of the vehicle 14, which is then fed back to the measurement module 88 to reassess the impacts of other vehicle characteristics impacted from the implementation of the steering angle command or other changes to the system. Accordingly, the curvature regulator 92 and the hitch angle regulator 90 continually process information from the measurement module 88 to provide accurate steering angle commands that place the trailer 12 on the desired curvature $\kappa_2$ and the desired backing path 26, without substantial overshoot or continuous oscillation of the path of travel about the desired curvature $\kappa_2$.

Figure 5:
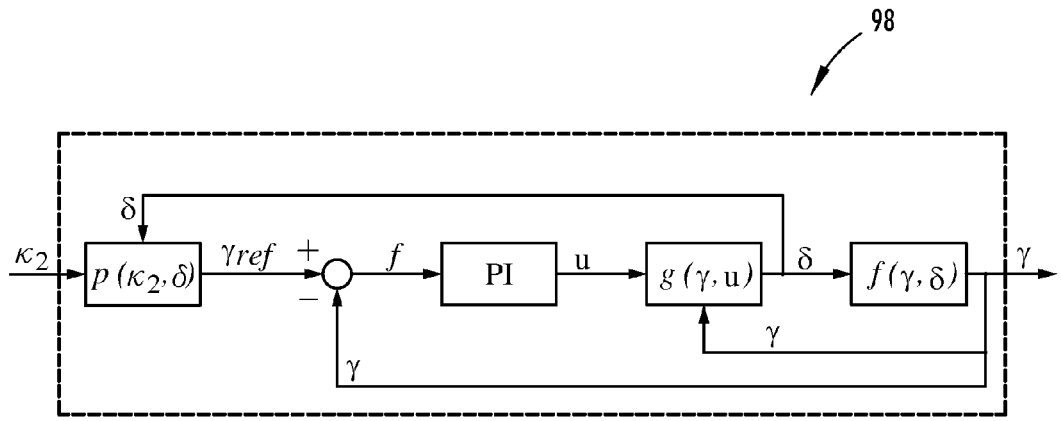
FIG. 5 is schematic block diagram of the curvature controller of FIG. 4, showing the feedback architecture and signal flow of the curvature controller, according to such an embodiment.

As also shown in FIG. 5, the embodiment of the curvature routine 98 shown in FIG. 4 is illustrated in a control system block diagram. Specifically, entering the control system is an input, $\kappa_2$, which represents the desired curvature of the desired backing path 26 of the trailer 12 that is provided to the curvature regulator 92. The curvature regulator 92 can be expressed as a static map, $p(\kappa_2, \delta)$, which in one embodiment is the following equation:

$$p(\kappa_2, \delta) = \tan^{-1}\left(\frac{\kappa_2 D + L\tan(\delta)}{\kappa_2 D L \tan(\delta) - W}\right)$$

Where, $\kappa_2$ represents the desired curvature of the trailer 12 or $1/r_2$ as shown in FIG. 3;

δ represents the steering angle;

L represents the distance from the rear axle of the vehicle 14 to the hitch pivot point;

D represents the distance from the hitch pivot point to the axle of the trailer 12; and W represents the distance from the rear axle to the front axle of the vehicle 14.

With further reference to FIG. 5, the output hitch angle of $p(\kappa_2, \delta)$ is provided as the reference signal, $\gamma_{ref}$, for the remainder of the control system, although the steering angle δ value used by the curvature regulator 92 is feedback from the non-linear function of the hitch angle regulator 90. It is shown that the hitch angle regulator 90 uses feedback linearization for defining a feedback control law, as follows:

$$g(u, \gamma, v) = \delta = \tan^{-1}\left(\frac{W}{v\left(1 + \frac{L}{D}\cos(\gamma)\right)}\left(u - \frac{v}{D}\sin(\gamma)\right)\right)$$

As also shown in FIG. 5, the feedback control law, $g(u, \gamma, v)$, is implemented with a proportional integral (PI) controller, whereby the integral portion substantially eliminates steady-state tracking error. More specifically, the control system illustrated in FIG. 5 may be expressed as the following differential-algebraic equations:

$$\dot{\gamma}(t) = \frac{v(t)}{D}\sin(\gamma(t)) + \left(1 + \frac{L}{D}\cos(\gamma(t))\right)\frac{v(t)}{W}\bar{\delta}$$

$$\tan(\delta) = \bar{\delta} = \frac{W}{v(t)\left(1 + \frac{L}{D}\cos(\gamma(t))\right)}\left(K_P(p(\kappa_2, \delta) - \gamma(t)) - \frac{v(t)}{D}\sin(\gamma(t))\right)$$

It is contemplated that the PI controller may have gain terms based on trailer length D since shorter trailers will generally have faster dynamics. In addition, the hitch angle regulator 90 may be configured to prevent the desired hitch angle γ(d) to reach or exceed a jackknife angle γ(j), as computed by the controller or otherwise determined by the trailer backup assist system 10, as disclosed in greater detail herein.

Figure 9:
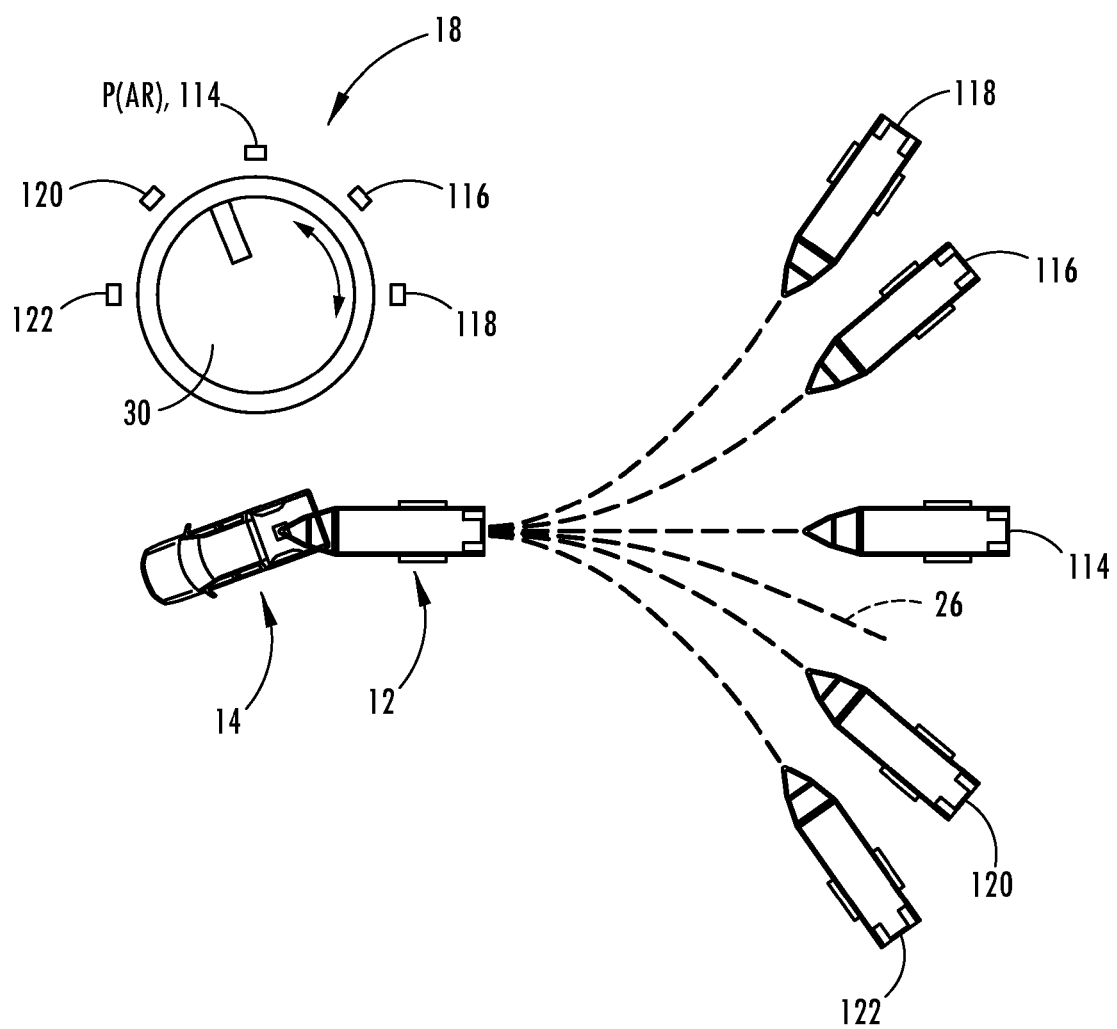
FIG. 9 is a plan view of one embodiment of a rotatable knob for selecting a desired curvature of a trailer and a corresponding schematic diagram illustrating a vehicle and a trailer with various trailer curvature paths correlating with desired curvatures that may be selected.

FIG. 9 shows an example of a trailer path curvature function plot for a steering input device 18 with a degree of rotation of the rotatable knob 30 correlating with the desired curvature of the trailer path. According to one embodiment, a relationship between the desired curvature relative to user input (e.g., amount of rotation) at the rotatable knob may be defined by a cubic function. However, a skilled person will appreciate that embodiments of the disclosed subject matter are not limited to any particular function between a magnitude and/or rate of input at a steering input device 18 (e.g., knob rotation) and a resulting desired curvature value. The desired curvature of the trailer 12 as commanded by the steering input device 18 and the trailer backup assist system 10 is described in greater detail below.

Figure 6:
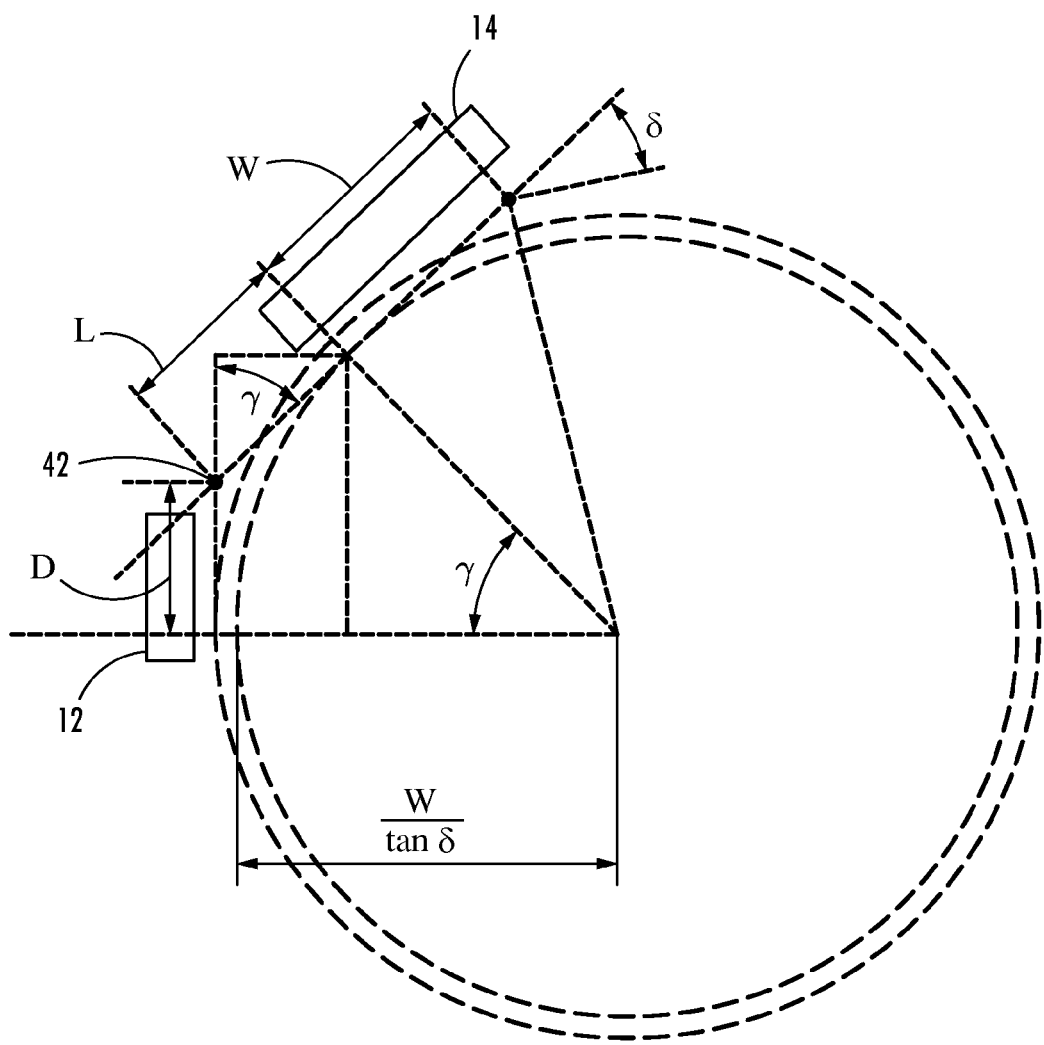
FIG. 6 is a schematic diagram showing a relationship between a hitch angle and a steering angle of the vehicle as it relates to curvature of the trailer and a jackknife angle.

Referring now to FIG. 6, in the illustrated embodiments of the disclosed subject matter, it is desirable to limit the potential for the vehicle 14 and the trailer 12 to attain a jackknife angle (i.e., the vehicle/trailer system achieving a jackknife condition). A jackknife angle γ(j) refers to a hitch angle γ that while backing cannot be overcome by the maximum steering input for a vehicle such as, for example, the steered front wheels of the vehicle 14 being moved to a maximum steered angle δ at a maximum rate of steering angle change. The jackknife angle γ(j) is a function of a maximum wheel angle for the steered wheel of the vehicle 14, the wheel base W of the vehicle 14, the distance L between hitch point and the rear axle of the vehicle 14, and the length D between the hitch point and the axle of the trailer 12 or the effective axle when the trailer 12 has multiple axles. When the hitch angle γ for the vehicle 14 and the trailer 12 achieves or exceeds the jackknife angle γ(j), the vehicle 14 may be pulled forward to reduce the hitch angle γ. Thus, for limiting the potential for a vehicle/trailer system attaining a jackknife angle, it is preferable to control the yaw angle of the trailer 12 while keeping the hitch angle γ of the vehicle/trailer system relatively small.

A kinematic model representation of the vehicle 14 and the trailer 12 can be used to determine a jackknife angle for the vehicle-trailer combination. Accordingly, with reference to FIGS. 3 and 6, a steering angle limit for the steered front wheels requires that the hitch angle γ cannot exceed the jackknife angle γ(j), which is also referred to as a critical hitch angle γ. Thus, under the limitation that the hitch angle γ cannot exceed the jackknife angle γ(j), the jackknife angle γ(j) is the hitch angle γ that maintains a circular motion for the vehicle/trailer system when the steered wheels 64 are at a maximum steering angle δ(max). The steering angle for circular motion with hitch angle γ is defined by the following equation.

$$\tan \delta_{max} = \frac{w \sin \gamma_{max}}{D + L \cos \gamma_{max}}$$

Solving the above equation for hitch angle γ allows jackknife angle γ(j) to be determined. This solution, which is shown in the following equation, can be used in implementing trailer backup assist functionality in accordance with the disclosed subject matter for monitoring hitch angle γ in relation to jackknife angle.

$$\cos \overline{\gamma} = \frac{-b \pm \sqrt{b^2 - 4ac}}{2a}$$

where,
a=$L^2 \tan^2 \delta(max) + W^2$;
b=2 LD $\tan^2 \delta(max)$; and
c=$D^2 \tan^2 \delta(max) - W^2$.

In certain instances of backing the trailer 12, a jackknife enabling condition can arise based on current operating parameters of the vehicle 14 in combination with a corresponding hitch angle γ. This condition can be indicated when one or more specified vehicle operating thresholds are met while a particular hitch angle γ is present. For example, although the particular hitch angle γ is not currently at the jackknife angle for the vehicle 14 and attached trailer 12, certain vehicle operating parameters can lead to a rapid (e.g., uncontrolled) transition of the hitch angle γ to the jackknife angle for a current commanded trailer path curvature and/or can reduce an ability to steer the trailer 12 away from the jackknife angle. One reason for a jackknife enabling condition is that trailer curvature control mechanisms (e.g., those in accordance with the disclosed subject matter) generally calculate steering commands at an instantaneous point in time during backing of a trailer 12. However, these calculations will typically not account for lag in the steering control system of the vehicle 14 (e.g., lag in a steering EPAS controller). Another reason for the jackknife enabling condition is that trailer curvature control mechanisms generally exhibit reduced steering sensitivity and/or effectiveness when the vehicle 14 is at relatively high speeds and/or when undergoing relatively high acceleration.

Jackknife determining information may be received by the curvature controller 28, according to one embodiment, to process and characterize a jackknife enabling condition of the vehicle-trailer combination at a particular point in time (e.g., at the point in time when the jackknife determining information was sampled). Examples of the jackknife determining information include, but are not limited to, information characterizing a hitch angle γ, information characterizing a vehicle accelerator pedal transient state, information characterizing a speed of the vehicle 14, information characterizing longitudinal acceleration of the vehicle 14, information characterizing a brake torque being applied by a brake system of the vehicle 14, information characterizing a powertrain torque being applied to driven wheels of the vehicle 14, and information characterizing the magnitude and rate of driver requested trailer curvature. In this regard, jackknife determining information would be continually monitored, such as by an electronic control unit (ECU) that carries out trailer backup assist (TBA) functionality. After receiving the jackknife determining information, a routine may process the jackknife determining information for determining if the vehicle-trailer combination attained the jackknife enabling condition at the particular point in time. The objective of the operation for assessing the jackknife determining information is determining if a jackknife enabling condition has been attained at the point in time defined by the jackknife determining information. If it is determined that a jackknife enabling condition is present at the particular point in time, a routine may also determine an applicable countermeasure or countermeasures to implement. Accordingly, in some embodiments, an applicable countermeasure will be selected dependent upon a parameter identified as being a key influencer of the jackknife enabling condition. However, in other embodiments, an applicable countermeasure will be selected as being most able to readily alleviate the jackknife enabling condition. In still another embodiment, a predefined countermeasure or predefined set of countermeasures may be the applicable countermeasure(s).

The objective of a countermeasure in the context of the disclosed subject matter (i.e., a jackknife reduction countermeasure) is to alleviate a jackknife enabling condition. To this end, such a countermeasure can be configured to alleviate the jackknife enabling condition using a variety of different strategies. In a vehicle speed sensitive countermeasure strategy, actions taken for alleviating the jackknife enabling condition can include overriding and/or limiting driver requested changes to the radius of curvature of the trailer 12 (e.g., being requested via a steering input apparatus configured in accordance with the disclosed subject matter) as a function of vehicle speed (e.g., via a lookup table correlating radius of curvature limits to vehicle speed). For example, the plurality of potential backing paths that are selectable by the steering input device 18 as the desired backing path 26 may be limited to exclude those with a high curvature values indicative of a jackknife enabling condition. Also, in a countermeasure strategy where trailer curvature requests are limited as a function of speed and driver curvature command transient rates, actions taken for alleviating the jackknife enabling condition can include rate limiting trailer curvature command transients as requested by a driver above a predefined vehicle speed whereas, under the predefined vehicle speed, the as-requested trailer curvature are not rate limited. In a torque limiting countermeasure strategy, actions taken for alleviating the jackknife enabling condition can include application of full available powertrain torque being inhibited when the jackknife enabling condition is present while the vehicle 14 is above a predefined speed and application of full available powertrain torque being allowed when the vehicle speed is reduced below the predefined speed while in the torque inhibiting mode. As opposed to a fixed predefined speed, the torque limiting countermeasure strategy can utilize a speed threshold that is a function of hitch angle γ (i.e., speed threshold inversely proportional to hitch angle acuteness). In a driver accelerator pedal transient detection countermeasure strategy, actions taken for alleviating the jackknife enabling condition can include overriding and/or limiting driver requested trailer radius of curvature as a function of transient accelerator pedal requests (e.g., requested trailer radius of curvature limited when a large accelerator pedal transient is detected). In a hitch angle rate sensitive countermeasure strategy, actions taken for alleviating the jackknife enabling condition can include using hitch angle rate in a predefined or calculated mapping with current hitch angle position to limit driver requested trailer radius of curvature. Accordingly, in view of the disclosures made herein, a skilled person will appreciate that embodiments of the disclosed subject matter are not unnecessarily limited to a countermeasure strategy of any particular configuration.

As previously disclosed with reference to the illustrated embodiments, during operation of the trailer backup assist system 10, a driver of the vehicle 14 may be limited in the manner in which steering inputs may be made with the steering wheel 68 of the vehicle 14 due to the power assist steering system 62 being directly coupled to the steering wheel 68. Accordingly, the steering input device 18 of the trailer backup assist system 10 may be used for inputting a desired backing path 26 (i.e. curvature) of the trailer 12, thereby decoupling such commands from being made at the steering wheel 68 of the vehicle 14. However, additional embodiments of the trailer backup assist system 10 may have the capability to selectively decouple the steering wheel 68 from movement of steerable wheels 64 of the vehicle 14, thereby allowing the steering wheel 68 to be used for commanding changes in curvature of a path of a trailer 12 or otherwise selecting a desired backing path 26 during such trailer backup assist.

Figure 7:
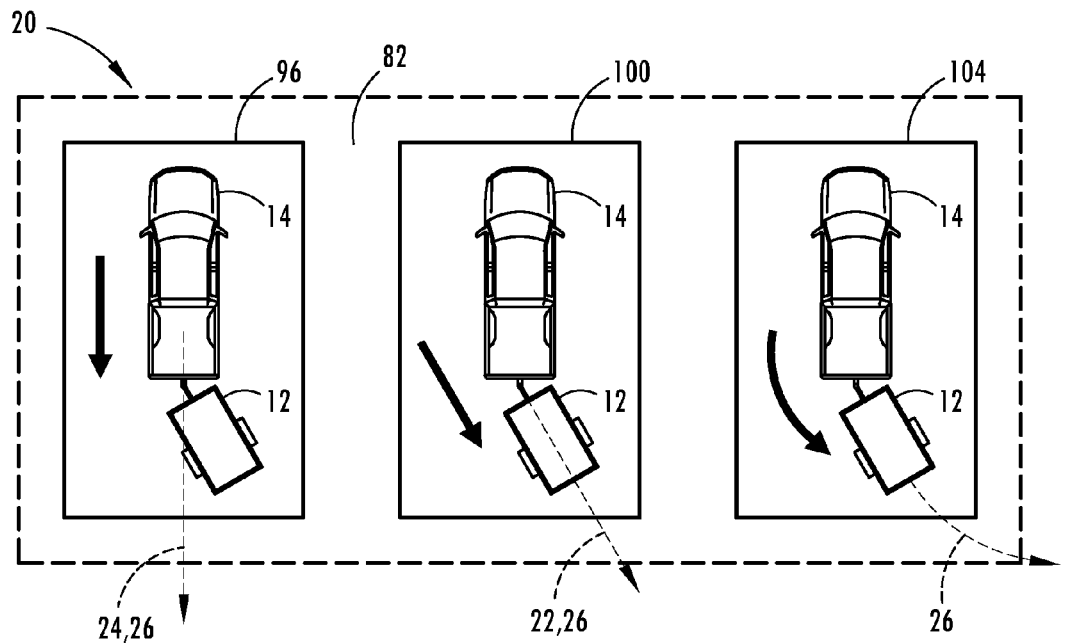
FIG. 7 is a plan view of a mode selection device having a series of buttons for selecting a control mode for operating the trailer backup assist system, according to one embodiment.

Referring now to FIG. 7, one embodiment of the steering input device 18 includes a mode selection device 20. The mode selection device 20 in the illustrated embodiment shown in FIG. 7 includes three discrete buttons provided on a display 82 of the vehicle HMI 80. Specifically, the center stack display 82 of the vehicle 14 as shown in FIG. 1 may include capacitive touch screen functionality for the driver to select one of the three buttons by manually touching one of the buttons on the display 82. It is also contemplated that the buttons may be provided on an alternative display, such as above the steering wheel 68, a heads up display, a display on a portable device, or other conceivable electronic displays within or on the vehicle 14, whereby one of the buttons may be alternatively selected, such as with operational buttons on the steering wheel 68. It is also contemplated that the buttons of the mode selection device 20 may be physical push-buttons or switches arranged on the center stack, the center console, or another interior surface of the vehicle 14.

As also shown in the embodiment of the mode selection device 20 illustrated in FIG. 7, three distinct backing control modes 94 are each provided with one of the three discrete buttons, such that one may be individually selected to provide a command to the curvature controller 28 indicative of a desired backing path 26 for the trailer 12 to follow. In the illustrated embodiment, it is understood that the vehicle 14 and trailer 12 must be in a static orientation relative to each other to select one of the buttons, whereby the static position is defined by the vehicle 14 and the trailer 12 also being stopped relative to the ground surface. However, it is contemplated that alternative embodiments of the mode selection device 20 or alternative backing control modes thereof may be selected during reversing movement of the vehicle 14 and/or trailer 12. A first button 96 allows for the selection of the vehicle 14 in the static orientation to define a backing path 26 oriented in line with a longitudinal direction 24 of the vehicle 14. With the selection of the first button 96, the curvature controller 28 may process a vehicle straight routine that may be stored in the memory 86 of the trailer backup assist system 10. In general, the vehicle straight routine may generates steering commands for the vehicle 14 to guide the trailer 12 from its orientation in the static orientation at the time the first button 96 is selected to a position with its longitudinal direction 22 in line with the longitudinal direction 24 of the vehicle 14 in the static orientation. Upon placing the trailer 12 in line with the longitudinal direction 24 of the vehicle 14 in the static orientation, the vehicle 14 may then operate to guide the trailer 12 straight along the longitudinal direction 24 of the vehicle 14 in the static orientation with a desired curvature input of zero. The longitudinal directions 24 of the vehicle 14 and the trailer 12 may be further defined by a longitudinal center line axis, such as the orientation of the tongue 36 of the trailer 12 and the orientation of the vehicle hitch connector protruding from the vehicle 14.

With continued reference to the embodiment of the mode selection device 20 illustrated in FIG. 7, a second button 100 may be selected to command the curvature controller 28 to process a trailer straight routine, which may similarly be stored in the memory 86 of the trailer backup assist system 10. The trailer straight routine may define a backing path 26 for the trailer 12 in the static orientation, such that the backing path 26 is defined by a longitudinal direction 22 of the trailer 12 in the static orientation. In general, the trailer straight routine generates steering commands to the power assist steering system 62 that maneuver the vehicle 14 to substantially maintain the orientation of the trailer 12 with respect to the ground surface and surrounding environment and guide the trailer 12 along the backing path 26. Upon steering the vehicle 14 to an orientation to substantially maintain the movement of the trailer 12 on the backing path 26, the vehicle 14 will then operate to guide the trailer 12 straight along the longitudinal direction 22 of the trailer 12 in the static orientation with a desired curvature input of zero.

A third button 104 of the mode selection device 20, as illustrated in the embodiment shown in FIG. 7, may be selected to command the curvature controller 28 to process a locked curvature routine, which may also be stored in the memory 86 of the trailer backup assist system 10. According to one embodiment, the locked curvature routine may define a desired curvature based on the hitch angle γ between the vehicle 14 and the trailer 12 in the static orientation. In general, the locked curvature routine, according to one embodiment, locks the desired curvature or desired backing path 26 input, such that the trailer 12 will follow a circular path with a generally consistent radius. Accordingly, if the vehicle 14 and trailer 12 are arranged in the static orientation with a hitch angle γ of zero or substantially zero, the desired curvature input may be zero to reverse the trailer 12 in a substantially straight backing path. It is contemplated that the mode selection device 20 in additional embodiments may include more or fewer backing control modes or routines and accordingly more or fewer selection buttons.

Figure 8:
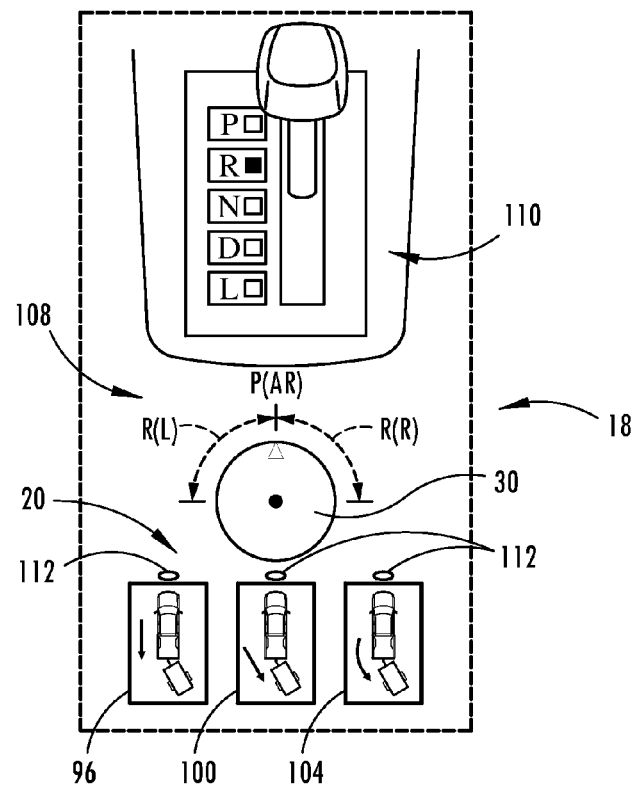
FIG. 8 is a plan view of a steering input device having a rotatable knob and a mode selection device for operating the trailer backup assist system, according to one embodiment.

An additional embodiment of the mode selection device 20 is illustrated in FIG. 8, whereby the three discrete buttons of the mode selection device 20 are disposed on a center console 108 of the vehicle proximate a shifter 110 and a rotatable knob 30. Each of the described buttons are provided with an illumination source, which in the illustrated embodiment is proved as an LED 112 proximate each discrete button. In this embodiment, the rotatable knob 30 may be used to supplement the mode selection device 20 in providing the curvature controller 28 with the desired backing path of the trailer 12. It is contemplated that the rotatable knob 30, in additional embodiments, may be used to override the mode selection device 20 and independently provide a desired backing path to the curvature routine 98 for generating steering commands as described with reference to FIGS. 4 and 5.

The rotatable knob 30, as illustrated in FIGS. 8-9, is biased (e.g., by a spring return) to an at-rest position P(AR) between opposing rotational ranges of motion R(R), R(L). In the illustrated embodiment, a first one of the opposing rotational ranges of motion R(R) is substantially equal to a second one of the opposing rotational ranges of motion R(L), R(R). To provide a tactile indication of an amount of rotation of the rotatable knob 30, a force that biases the knob toward the at-rest position P(AR) can increase (e.g., non-linearly) as a function of the amount of rotation of the rotatable knob 30 with respect to the at-rest position P(AR). Additionally, the rotatable knob 30 can be configured with position indicating detents such that the driver can positively feel the at-rest position P(AR) and feel the ends of the opposing rotational ranges of motion R(L), R(R) approaching (e.g., soft end stops). The rotatable knob 30 may generate a desired curvature value as function of an amount of rotation of the rotatable knob 30 with respect to the at-rest position P(AR) and a direction of movement of the rotatable knob 30 with respect to the at-rest position P(AR). It is also contemplated that the rate of rotation of the rotatable knob 30 may be used to determine the desired curvature output to the curvature controller 28. As will be discussed below in greater detail, the at-rest position P(AR) of the knob corresponds to a movement sensing device signal indicating that the vehicle 14 should be steered such that the trailer 12 is backed along a substantially straight backing path (zero trailer curvature request from the driver), as defined by the longitudinal direction 22 of the trailer 12 when the knob was returned to the at-rest position P(AR). A maximum clockwise and anti-clockwise position of the knob (i.e., limits of the opposing rotational ranges of motion R(R), R(L)) each correspond to a respective movement sensing device signal indicating a tightest radius of curvature (i.e., most acute trajectory) of a path of travel of the trailer 12 that is possible without the corresponding vehicle steering information causing a jackknife condition. In this regard, the at-rest position P(AR) is a zero curvature commanding position with respect to the opposing rotational ranges of motion R(R), R(L). Accordingly, a ratio of a commanded curvature of a path of a trailer 12 (e.g., radius of a desired backing path) and a corresponding amount of rotation of the knob can vary (e.g., non-linearly) over each one of the opposing rotational ranges of motion R(L), R(R) of the knob. It is also disclosed therein that the ratio can be a function of vehicle speed, trailer geometry, vehicle geometry, hitch geometry and/or trailer load.

Figure 10:
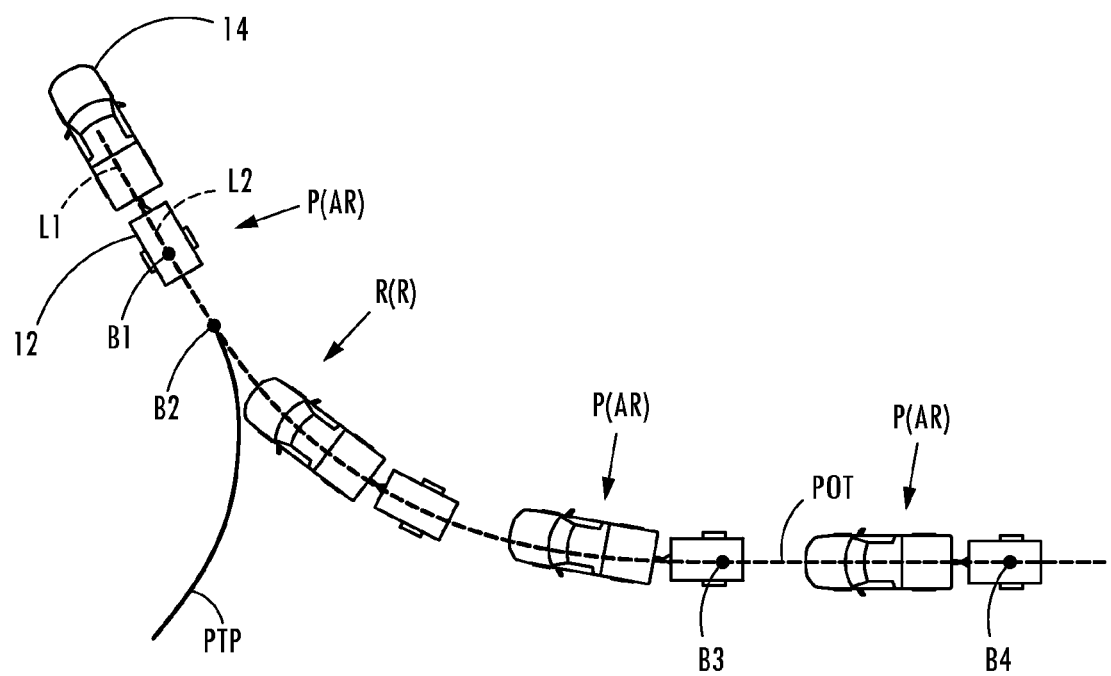
FIG. 10 is a schematic diagram showing a backup sequence of a vehicle and a trailer implementing various curvature selections with the trailer backup assist system, according to one embodiment.

With reference to FIGS. 9-10, as a driver of the vehicle 14 backs the trailer 12, the driver can turn the rotatable knob 30 to provide a desired curvature or desired backing path 26 for the trailer or, similarly, to override/modify the desired curvature or desired backing path 26 commanded by the mode selection device 20. According to the embodiment shown in FIG. 9, the steering input device 18 is embodied as a rotatable knob 30 for allowing the driver of the vehicle 14 to command a desired backing path 26 by indicting a desired curvature. In the illustrated embodiment, the rotatable knob 30 rotates about a central axis between a middle position 114 corresponding to a substantially straight backing path 26 of travel, as defined by the longitudinal direction 22 of the trailer 12, and various rotated positions 116, 118, 120, 122 on opposing sides of the middle position 114, commanding a desired curvature $\kappa_2$ corresponding to a radius of the desired backing path 26 of travel for the trailer 12 at the commanded rotated position. It is contemplated that the rotatable knob 30 may be configured in accordance with embodiments of the disclosed subject matter and omit a means for being biased to an at-rest position P(AR) between opposing rotational ranges of motion. Lack of such biasing may allow a current rotational position of the rotatable knob 30 to be maintained until the rotational control input device 30 is manually moved to a different position. It is also conceivable that the steering input device 18 may include a non-rotational control device that may be configured to selectively provide a desired backing path 26 and to override or supplement the mode selection device 20 or another steering input device 18. Examples of such a non-rotational control input device include, but are not limited to, a plurality of depressible buttons (e.g., curve left, curve right, and travel straight), a touch screen on which a driver traces or otherwise inputs a curvature for path of travel commands, a button that is translatable along an axis for allowing a driver to input backing path commands, or a joystick type input and the like.

According to some embodiments, the rotatable knob 30 or other steering input device 18 may be configured to provide a tactile feedback signal (e.g., a vibration through the knob) as a warning if any one of a variety of conditions occur. For instance, conditions to prompt a tactile feedback signal may include the trailer 12 approaching a jackknife angle, the vehicle or the trailer approaching an object 19, the trailer backup assist system 10 having a failure, the trailer backup assist system 10 detecting a fault, the trailer backup assist system 10 or other system of the vehicle 14 has predicted a collision on the present path of travel of the trailer 12, the trailer backup system has restricted a commanded curvature or reduced the available backing paths (e.g., due to excessive speed of the vehicle 14 or due to the proximity of an object 19 in the perimeter field 21), and the like. Still further, it is conceivable that the steering input device 18 can use illumination and/or an audible signal output (e.g. speaker) to provide certain feedback information or warnings.

Referring again to FIG. 10, an example of using the steering input device 18 for dictating a curvature of a desired backing path of travel (POT) of the trailer 12 while backing up the trailer 12 with the vehicle 14 is shown. In preparation of backing the trailer 12, the driver of the vehicle 14 may drive the vehicle 14 forward along a pull-thru path (PTP) to position the vehicle 14 and trailer 12 at a first backup position B1. In the first backup position B1, the vehicle 14 and trailer 12 are longitudinally aligned with each other such that a longitudinal centerline axis L1 of the vehicle 14 is aligned with (e.g., parallel with or coincidental with) a longitudinal centerline axis L2 of the trailer 12. It is disclosed herein that such alignment of the longitudinal axis L1, L2 at the onset of an instance of trailer backup functionality is not a requirement for operability of a trailer backup assist system 10, but may be done for calibration.

After activating the trailer backup assist system 10 (e.g., before, after, or during the pull-thru sequence), the driver begins to back the trailer 12 by reversing the vehicle 14 from the first backup position B1. So long as the rotatable knob 30 of the trailer backup steering input device 18 remains in the at-rest position P(AR) and no other steering input devices 18, such as the mode selection device 20, are activated, the trailer backup assist system 10 will steer the vehicle 14 as necessary for causing the trailer 12 to be backed along a substantially straight path of travel, as defined by the longitudinal direction 22 of the trailer 12, specifically the centerline axis L2 of the trailer 12, at the time when backing of the trailer 12 began. When the trailer 12 reaches the second backup position B2, the driver rotates the rotatable knob 30 to command the trailer 12 to be steered to the right (i.e., a knob position R(R) clockwise rotation).

Accordingly, the trailer backup assist system 10 will steer the vehicle 14 for causing the trailer 12 to be steered to the right as a function of an amount of rotation of the rotatable knob 30 with respect to the at-rest position P(AR), a rate movement of the knob, and/or a direction of movement of the knob with respect to the at-rest position P(AR). Similarly, the trailer 12 can be commanded to steer to the left by rotating the rotatable knob 30 to the left. When the trailer 12 reaches backup position B3, the driver allows the rotatable knob 30 to return to the at-rest position P(AR) thereby causing the trailer backup assist system 10 to steer the vehicle 14 as necessary for causing the trailer 12 to be backed along a substantially straight path of travel as defined by the longitudinal centerline axis L2 of the trailer 12 at the time when the rotatable knob 30 was returned to the at-rest position P(AR). Thereafter, the trailer backup assist system 10 steers the vehicle 14 as necessary for causing the trailer 12 to be backed along this substantially straight path to the fourth backup position B4. In this regard, arcuate portions of a path of travel POT of the trailer 12 are dictated by rotation of the rotatable knob 30 and straight portions of the path of travel POT are dictated by an orientation of the centerline longitudinal axis L2 of the trailer 12 when the knob is in/returned to the at-rest position P(AR).

In the embodiment illustrated in FIG. 10, in order to activate the trailer backup assist system 10, the driver interacts with the trailer backup assist system 10 and the automatically steers as the driver reverses the vehicle 14. As discussed above, the driver may command the trailer backing path 26 by using a steering input device 18 and the curvature controller 28 may determine the vehicle steering angle to achieve the desired backing path 26, whereby the driver controls the throttle and brake while the trailer backup assist system 10 controls the steering.

Figure 11:
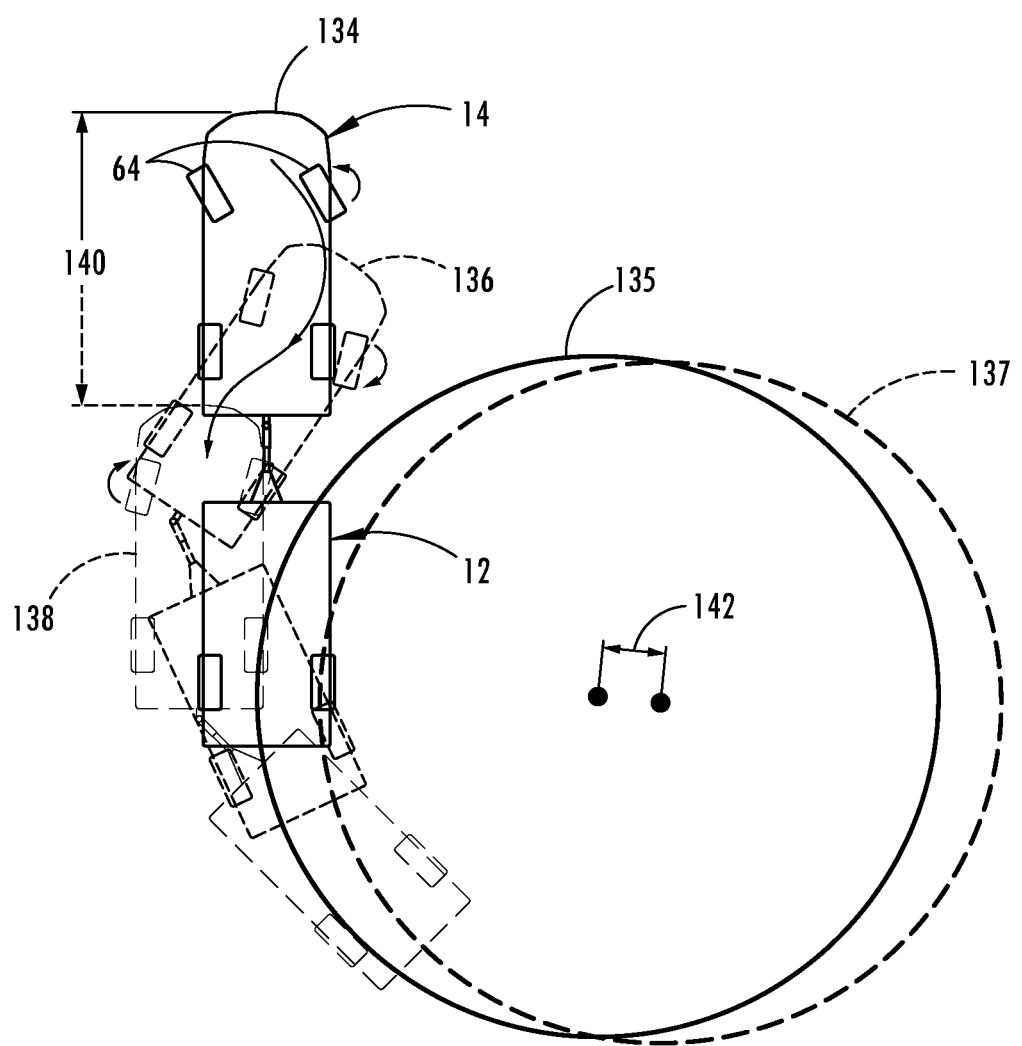
FIG. 11 is a schematic diagram showing a vehicle being steered with a steering command to guide a trailer to a desired curvature, according to one embodiment.

Referring now to FIG. 11, a vehicle 14 is shown reversing a trailer 12 that does not actuate the wheel brakes of the trailer braking system 13 or otherwise does not include such braking capability. At the initial position 134, the vehicle 14 and the trailer 12 are substantially in line, having a hitch angle of approximately zero, and the steering input device 18 of the trailer backup assist system is providing a desired curvature for the trailer 12, which is illustrated by the solid circle 135. Upon receiving the desired curvature from the steering input device 18, the curvature controller 28 generates a steering command that initially steers the steerable wheels 64 of the vehicle to a left angled direction for moving the vehicle 14 to an orientation that causes the hitch angle to approach a degree corresponding with the desired curvature. Upon reaching an intermediate position 136 that generally positions the hitch angle near the corresponding desired curvature, the curvature controller 28 generates a steering command that then steers the steerable wheels 64 of the vehicle 14 in an opposite direction for moving the vehicle to a final position 138 that generally allows the vehicle 14 to guide the trailer 12 continuously along the desired curvature, which is illustrated by the circle in dashed lines 137. The rearward travel distance between the initial position of the vehicle and the final position is shown longitudinally with reference number 140. However, it is understood that the rearward travel distance may also be defined as the measured distance along the curved path traveled by a fixed central point of the vehicle between the steered wheels 64. As shown, the distance 142 between the initially input desired curvature and the achieved desired curvature is a lateral distance in the illustrated embodiment.

Figure 12:
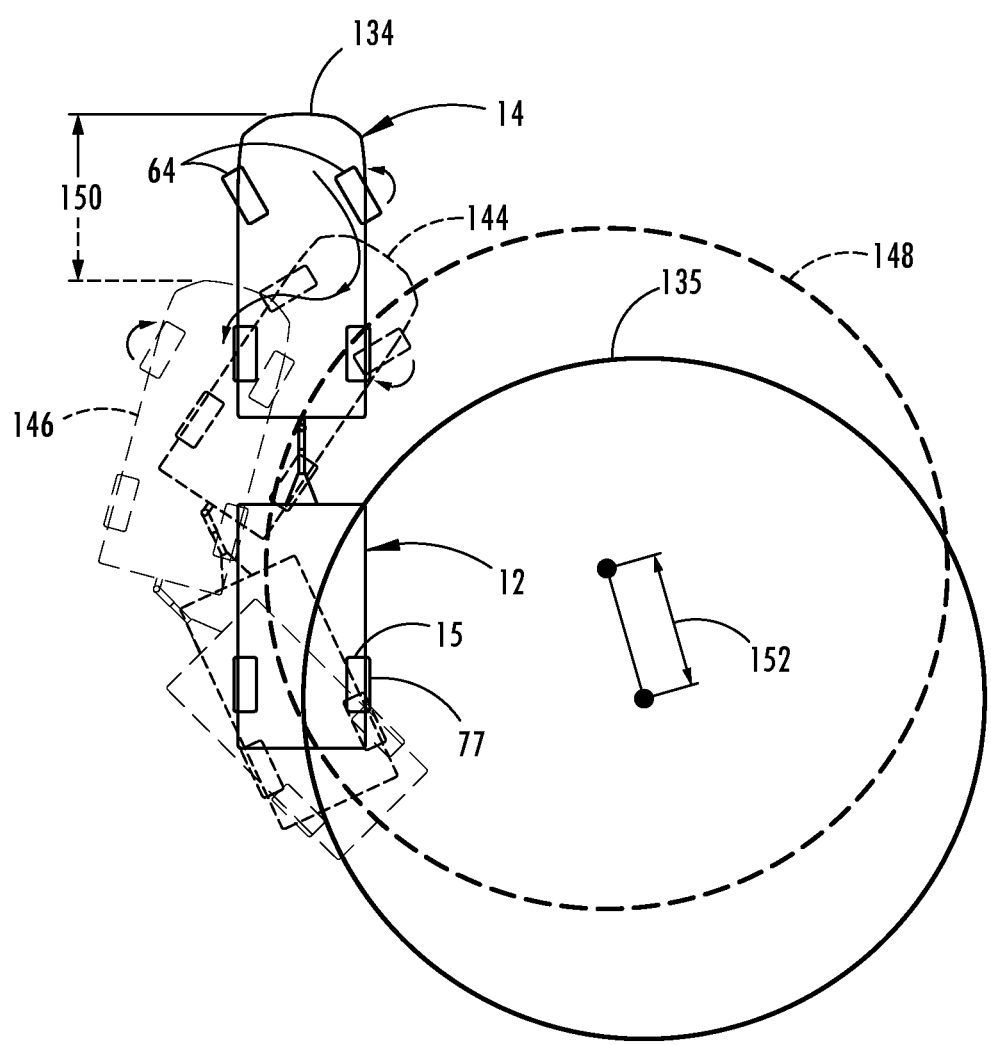
FIG. 12 is a schematic diagram showing a vehicle being steered with a steering command and a trailer being braked with an actuation command to guide the trailer to a desired curvature, according to one embodiment.

In the embodiment illustrated in FIG. 12, a vehicle 14 is reversing a trailer 12 similar to that shown in FIG. 11, except that the trailer 12 in FIG. 12 is actuating the trailer braking system 13. Specifically, the right wheel brake 77 on the inside of the desired curvature is independently braking the associated wheel 15 of the trailer 12 to reduce the rearward travel distance to achieve the desired curvature. When comparing the backing maneuvers shown in FIGS. 11 and 12, it can be seen that the initial positions 134 are substantially the same, with the hitch angles being approximately zero and the steering input device 18 of the trailer backup assist system 10 providing a desired curvature for the trailer 12, which is illustrated by a substantially identical solid circle 135. However, differences become more apparent when departing further from the initial position 134. The curvature controller 28 generates a steering command that initially steers the steerable wheels 64 of the vehicle 14 to a similarly oriented left angled direction for again moving the vehicle 14 to an orientation that causes the hitch angle to approach a degree corresponding with the desired curvature. However, the intermediate position 144 shown in FIG. 12, is approached slightly sooner than the intermediate position 136 shown in FIG. 11 due to the right wheel 15 of the trailer remaining in approximately a fixed position. Upon reaching an intermediate position 144, the hitch angle is approaching the corresponding desired curvature, such that the curvature controller 28 generates a steering command that then steers the steerable wheels 64 of the vehicle 14 in an opposite direction for moving the vehicle 14 to a final position 146 that generally allows the vehicle to guide the trailer continuously along the desired curvature, which is again illustrated by the circle in dashed lines 148. Again, the final position 146 in FIG. 12 is approached sooner than the final position 138 in FIG. 11. To clearly illustrate these differences, the rearward travel distance between the initial position 134 of the vehicle 14 and the final position 146 is shown longitudinally with reference number 150. Again, it is understood that the rearward travel distance may be defined as the measured distance along the curved path traveled by a fixed central point of the vehicle. Also, it can be seen that the distance 152 between the initially input desired curvature and the achieved desired curvature is a more longitudinally angled distance that is actually achieved closer to the initial position 134 of the vehicle 14 and the trailer than the initial desired curvature.

Figure 13:
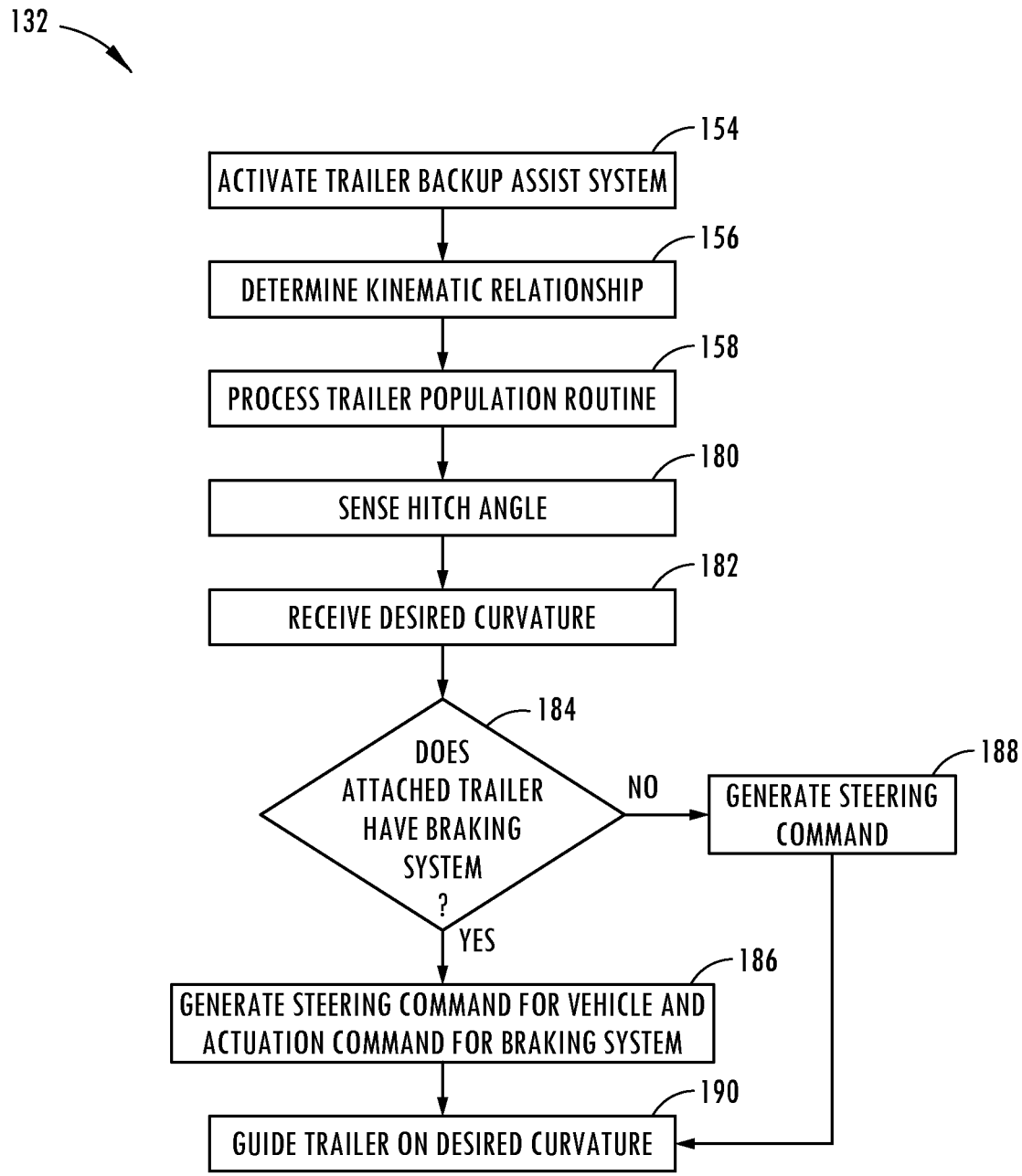
FIG. 13 is a flow diagram illustrating a method of operating a trailer backup assist system with active trailer braking using a trailer braking routine, according to one embodiment.

With reference to FIG. 13, a method of operating one embodiment of the trailer braking routine 132 of the trailer backup assist system 10 is illustrated. At step 154, the method is initiated by the trailer backup assist system 10 being activated. It is contemplated that this may be done in a variety of ways, such a making a selection on the display 82 on the vehicle HMI 80. The next step 156, then determines the kinematic relationship between the attached trailer 12 and the vehicle 14. To determine the kinematic relationship, various parameters of the vehicle 14 and the trailer 12 must be sensed, input by the driver, or otherwise determined for the trailer backup assist system 10 to generate steering commands to the power assist steering system 62 in accordance with the desired curvature or backing path 26 of the trailer 12. As disclosed with reference to FIGS. 3-6, the kinematic parameters to define the kinematic relationship include a length of the trailer 12, a wheel base of the vehicle 14, a distance from a hitch connection to a rear axle of the vehicle 14, and a hitch angle γ between the vehicle 14 and the trailer 12, among other variables and parameters as previously described. Accordingly, after the kinematic relationship is determined, the trailer backup assist system 10 may proceed at step 158 to process the trailer population routine 130.

Figure 14:
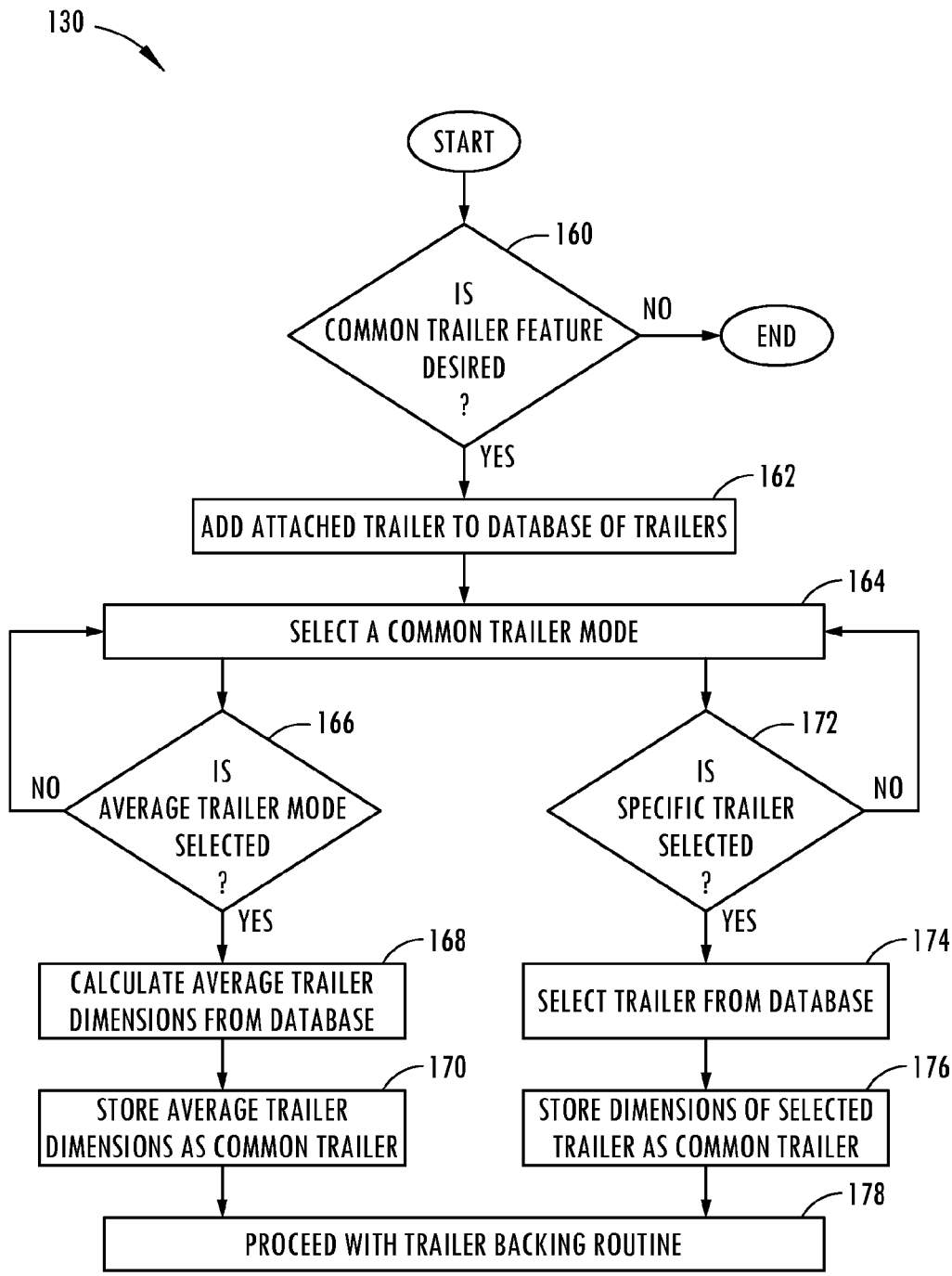
FIG. 14 is a flow diagram illustrating a method of operating a trailer backup assist system using a trailer population routine, according to one embodiment.

As shown in FIG. 14, one embodiment of the trailer population routine 130 is illustrated. The first determination of the illustrated trailer population routine 130 is at step 160, where it is determined whether a common trailer feature is desired. The common trailer feature may allow the curvature controller 28 to generate steering commands and trailer brake actuation commands to make the attached trailer 12 behave in response to inputs by the steering input device 18 in substantially the same manner as a common trailer, as defined by the trailer population routine 130. If the common trailer feature is not desired, the trailer population routine 130 ends and the trailer braking routine 132 proceeds. Otherwise, the attached trailer 12 is added to a stored database of trailers at step 162. The stored database of trailers may be a database of the trailers previously attached to the vehicle 14, trailers previously attached to the vehicle 14 that have been reversed with the trailer backup assist system 10, trailers capable of being attached to the vehicle 14, and other conceivable groupings of trailers.

At step 164 of the trailer population routine 130 illustrated in FIG. 14, the driver is prompted to select a common trailer mode, such as on the display 82 of the vehicle HMI 80. The illustrated trailer population routine 130 sets forth an average trailer mode and a specific trailer mode for potential selection, although it is understood that more or fewer common trailer modes may be selected. If it is determined at step 166 that the average trailer mode is selected, the routine calculates the average trailer dimensions from the database of trailers at step 168. With the average trailer dimensions, at step 170, the common trailer is defined with the average trailer dimensions for use in generating speed commands, steering commands, and trailer brake actuation commands that cause the attached trailer 12 to achieve the desired curvature in substantially the same rearward travel distance as the common trailer. Otherwise, if it is determined at step 172 that the specific trailer mode is selected, the routine prompts the driver to select a trailer from the database that the driver desires to be the common trailer at step 174. It is also contemplated that the driver may alternatively input dimensions to be used as the common trailer. At step 176, the stored dimensions of the selected trailer are again stored to define the common trailer for use in generating speed commands, steering commands, and trailer brake actuation commands that cause the attached trailer 12 to achieve the desired curvature in substantially the same rearward travel distance as the common trailer. Upon storing dimensions of the common trailer variable, the trailer braking routine 132 resumes at step 178.

Referring again to FIG. 13, at step 180 the hitch angle $\gamma$ is sensed between the vehicle 14 and the trailer 12, although this may be done continuously during operation of the trailer backup assist system 10. It is contemplated that in additional embodiments of the trailer backup assist system 10 that the steps of determining the kinematic relationship and sensing the hitch angle $\gamma$ may occur before the trailer backup assist system 10 is activated or at any other time before steering commands are generated. Accordingly, at step 182, the desired curvature is received from the steering input device 18. Before generating steering commands, at step 184 the trailer braking routine 132 determines whether the attached trailer 12 has a braking system 13. If a braking system 13 is sensed on the trailer 12 or otherwise determined to be present on the trailer 12, steering commands may be generated along with actuation commands for the braking system 13 at step 186, based on the desired curvature, the sensed hitch angle, and the common trailer, if one was defined by the trailer population routine 130. If a braking system 13 is not sensed or otherwise determined to be on the attached trailer 12, steering commands may be generated at step 188 based on the desired curvature, the sensed hitch angle, and the common trailer, if one was defined by the trailer population routine 130. The steering commands and actuation commands generated may be generated in conjunction with processing of the curvature routine 98, as previous discussed. At step 190, the steering commands and actuation commands have been executed to guide the trailer 12 on the desired curvature provided by the steering input device 18.

In parallel with performing the operations for receiving the trailer backup assist requests, determining the desired backing path 26 and curvature of the trailer 12, and generating the vehicle steering commands and trailer brake actuation commands, the trailer backup assist system 10 may perform an operation for monitoring if an unacceptable trailer backup condition exists. Examples of such monitoring include, but are not limited to assessing a hitch angle $\gamma$ to determine if a hitch angle $\gamma$ threshold is exceeded, assessing a backup speed to determine if a backup speed threshold is exceeded, assessing vehicle steering angle to determine if a vehicle steering angle threshold is exceeded, assessing other operating parameters (e.g., vehicle longitudinal acceleration, throttle pedal demand rate and hitch angle rate) for determining if a respective threshold value is exceeded, and the like. Backup speed can be determined from the wheel speed information obtained from one or more wheel speed sensors 58 of the vehicle 14. If it is determined that an unacceptable trailer backup condition exists, an operation may be performed for causing the current path of travel of the trailer 12 to be inhibited (e.g., stopping motion of the vehicle 14), followed by the operation being performed for ending the current trailer backup assist instance. It is disclosed herein that prior to and/or in conjunction with causing the current trailer path to be inhibited, one or more actions (e.g., operations) can be implemented for providing the driver with feedback (e.g., a warning) that such an unacceptable hitch angle condition is impending or approaching. In one example, if such feedback results in the unacceptable hitch angle condition being remedied prior to achieving a critical condition, the method can continue with providing trailer backup assist functionality in accordance with operations. Otherwise, the method can proceed to operation for ending the current trailer backup assist instance. In conjunction with performing the operation for ending the current trailer backup assist instance, an operation can be performed for controlling movement of the vehicle 14 to correct or limit a jackknife condition (e.g., steering the vehicle 14, decelerating the vehicle 14, limiting magnitude and/or rate of driver requested trailer curvature input, limiting magnitude and/or rate of the steering command, and/or the like to preclude the hitch angle from being exceeded).

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A trailer backup assist system for a vehicle, comprising:
    a trailer having a braking system;
    a steering input device providing a desired curvature for the trailer; and
    a controller generating a steering command for the vehicle and an actuation command for the braking system to guide the trailer on the desired curvature and to reduce a rearward travel distance to achieve the desired curvature, wherein the steering command and the actuation command are configured for a first trailer to achieve the desired curvature in substantially the same rearward travel distance as a second shorter trailer.

2. The trailer backup assist system of claim 1, further comprising:
    a speed sensor sensing a velocity of the vehicle, wherein the controller generates the steering command and the actuation command based on the velocity.

3. The trailer backup assist system of claim 1, further comprising:
    a sensor sensing a hitch angle between the trailer and the vehicle, wherein the steering command is generated based on the hitch angle and a length of the trailer.

4. The trailer backup assist system of claim 1, wherein the controller generates a speed command for regulating a reversing speed of the vehicle.

5. The trailer backup assist system of claim 1, wherein the actuation command for the braking system includes independently braking a wheel of the trailer on an inside of the desired curvature.

6. The trailer backup assist system of claim 1, wherein the actuation command for the braking system is generated when the rearward travel distance for the trailer to achieve the desired curvature without the actuation command is greater than a threshold distance.

7. The trailer backup assist system of claim 6, wherein the threshold distance is determined based on a length of the trailer, such that a longer length has a greater threshold distance than a shorter length.

8. The trailer backup assist system of claim 1, wherein the steering input device includes a knob that is rotatable between a first position having a first curvature and a second position having a second curvature, whereby a rotated position of the knob defines the desired curvature.

9. A method for reversing a trailer having a braking system, comprising:
    receiving a desired curvature of the trailer via a steering input device;
    sensing a hitch angle between the trailer and a vehicle via a hitch angle sensor; and
    providing a controller configured to:
        generate a steering command for the vehicle to guide the trailer on the desired curvature based on the hitch angle; and
        generate an actuation command for the braking system to reduce a rearward travel distance to achieve the desired curvature, wherein the actuation command for the braking system is generated when the rearward travel distance for the trailer to achieve the desired curvature without the actuation command is greater than a threshold distance; and wherein the threshold distance is determined based on a length of the trailer, such that a longer length has a greater threshold distance than a shorter length.

10. The method of claim 9, further comprising:
    sensing a speed of the vehicle with a speed sensor, wherein the steering command and the actuation command are generated based on the speed.

11. The method of claim 9, wherein the actuation command for the braking system includes independently braking a single wheel of the trailer on an inside of the desired curvature.

12. The method of claim 9, further comprising:
    generating a speed command via the controller for regulating output of a powertrain system of the vehicle.

13. The method of claim 12, wherein the speed command, the steering command, and the actuation command are together configured for a first trailer to achieve the desired curvature in substantially the same rearward travel distance as a shorter second trailer.

14. The method of claim 12, further comprising:
    storing lengths of a plurality of trailers to a memory, wherein the speed command, the steering command, and the actuation command are together generated for the trailer coupled with the vehicle to achieve the desired curvature in substantially the same rearward travel distance as an average rearward travel distance for the plurality of trailers to reach the desired curvature.

15. The method of claim 9, wherein the desired curvature is determined based on a rotated position of a knob that is rotatable between a plurality of positions corresponding with different curvatures.

16. A method for backing a trailer with a vehicle, comprising:
   providing a desired curvature for the trailer; and
   generating a steering command for the vehicle and an actuation command for a braking system of the trailer to guide the trailer on the desired curvature, wherein the steering command and the actuation command are configured for a first trailer to achieve the desired curvature in substantially a same rearward travel distance as a second shorter trailer.

17. The method of claim 16, wherein the steering command includes an angular change for steered wheels of the vehicle, and wherein the actuation command includes a braking force for at least one wheel of the trailer.

18. The method of claim 16, wherein the steering command and the actuation command are generated such that a hitch angle between the vehicle and the trailer is prevented from exceeding a jackknife threshold that is determined based on a length of the trailer and a wheelbase of the vehicle.

* * * * *